US012573742B2

(12) United States Patent
Ikeda et al.

(10) Patent No.: US 12,573,742 B2
(45) Date of Patent: Mar. 10, 2026

(54) ANTENNA SYSTEM, AND MANUFACTURING METHOD AND DESIGN METHOD FOR SAME

(71) Applicant: KURARAY CO., LTD., Kurashiki (JP)

(72) Inventors: Keisuke Ikeda, Kamisu (JP); Tatsuya Sunamoto, Tokyo (JP); Minoru Onodera, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 18/729,637

(22) PCT Filed: Jan. 17, 2023

(86) PCT No.: PCT/JP2023/001227

§ 371 (c)(1),
(2) Date: Jul. 17, 2024

(87) PCT Pub. No.: WO2023/140261

PCT Pub. Date: Jul. 27, 2023

(65) Prior Publication Data

US 2025/0096452 A1 Mar. 20, 2025

(30) Foreign Application Priority Data

Jan. 18, 2022 (JP) ................................ 2022-005959

(51) Int. Cl.
*H01Q 1/12* (2006.01)
*H01Q 1/22* (2006.01)
*H01Q 1/32* (2006.01)

(52) U.S. Cl.
CPC ................................ *H01Q 1/1271* (2013.01)

(58) Field of Classification Search
CPC .......... H01Q 1/1271; H01Q 1/22; H01Q 1/32; H01Q 1/40
See application file for complete search history.

(56) References Cited

U.S. PATENT DOCUMENTS

2017/0263999 A1 9/2017 Miyoshi et al.
2021/0005951 A1 1/2021 Horie et al.
(Continued)

FOREIGN PATENT DOCUMENTS

FR 3111197 A1 12/2021
JP 2000506705 A 5/2000
(Continued)

OTHER PUBLICATIONS

English translation of the International Preliminary Report on Patentability and Written Opinion issued Aug. 2, 2024 in PCT/JP2023/001227, 5 pages.
(Continued)

*Primary Examiner* — Hoang V Nguyen
(74) *Attorney, Agent, or Firm* — Element IP, PLC

(57) ABSTRACT

An antenna system includes: a laminate including a plurality of high-frequency permeable layers; and an antenna circuit board including a high-frequency insulating layer. n-th layer of the plurality of high-frequency permeable layers has a thickness Ln within a range of $L_{nmin}\pm\lambda(10\sqrt{\varepsilon_n})$. The n-th layer is at least one high-frequency permeable layer of the laminate. $\varepsilon_n$ denotes a relative dielectric constant of the n-th layer; $\lambda$ denotes a wavelength of the high-frequency wave that is incident on the laminate; and $L_{nmin}$ denotes a thickness of the n-th layer where an intensity of a reflected wave from the laminate is minimized, the intensity being determined as an intensity of a composite wave of reflected waves from a front surface, a back surface, and joint interfaces of the laminate.

13 Claims, 7 Drawing Sheets

(56) References Cited

U.S. PATENT DOCUMENTS

| | | | |
|---|---|---|---|
| 2021/0408675 | A1 | 12/2021 | Doke et al. |
| 2022/0302581 | A1 | 9/2022 | Sunamoto et al. |

FOREIGN PATENT DOCUMENTS

| | | | | |
|---|---|---|---|---|
| JP | 2005033475 A | 2/2005 | | |
| JP | 2007049225 A | 2/2007 | | |
| JP | 2007097084 A | 4/2007 | | |
| WO | WO-2019177144 A1 | 9/2019 | | |
| WO | WO-2021106418 A1 | 6/2021 | | |
| WO | WO-2021112031 A1 | 6/2021 | | |
| WO | WO-2021112032 A1 * | 6/2021 | ............. | H01Q 1/405 |

OTHER PUBLICATIONS

International Search Report issued Apr. 4, 2023 in PCT/JP2023/001227 (with English translation), 4 pages.

Extended European Search Report issued Dec. 4, 2025, in corresponding European Patent Application No. 23743255.4, 14 pages.

* cited by examiner

ANTENNA SYSTEM, AND MANUFACTURING METHOD AND DESIGN METHOD FOR SAME

CROSS REFERENCE TO THE RELATED APPLICATION

This application is based on and claims Convention priority to Japanese patent application No. 2022-005959, filed Jan. 18, 2022, the entire disclosure of which is herein incorporated by reference as a part of this application.

BACKGROUND OF THE INVENTION

Field of the Invention

The present invention relates to an antenna system useful for communication by high-frequency wave.

Description of Related Art

Conventionally, it is known to provide a moving object such as an automobile, a window glass of a building, or an electronic device such as a smartphone with an antenna made of a conductive wire for transmitting and receiving information. In recent years, the amount of information being transmitted has continued to increase. Thus, antennas that transmit and receive high-frequency radio wave (also simply referred to as "high-frequency wave") in GHz band are required in order to exchange large amount of information. For example, with respect to a high-frequency compatible antenna unit, Patent Document 1 (International Publication WO2019/177144) discloses a configuration in which a radiating element formed of a conductive member, and a waveguide member are arranged apart from each other with a dielectric member interposed therebetween.

Patent Document 2 (International Publication WO 2021/112031) discloses, as an antenna system to be used at frequencies of 1 GHz or higher, an antenna system including: a high-frequency permeable first glass layer; a low dielectric layer that has a lower relative dielectric constant than the first glass layer, and is disposed adjacent to the first glass layer to transmit high-frequency wave incident from the first glass layer; and an antenna circuit board including a high-frequency insulating layer that is disposed adjacent to the low dielectric layer and receives high-frequency wave incident from the low dielectric layer.

CONVENTIONAL ART DOCUMENT

Patent Document

[Patent Document 1] International Publication WO 2019/177144

[Patent Document 2] International Publication WO 2021/112031

SUMMARY OF THE INVENTION

An antenna to be provided on window glass of a moving object such as an automobile is preferably as thin as possible. Although the antenna unit disclosed in Patent Document 1 is described to be compatible with high-frequency wave, the antenna unit is used for window glass of buildings, and has a large thickness as a whole unit.

Patent Document 2 discloses an antenna system having a thin structure that is applicable to a window glass of a moving object. However, the optimum conditions are determined on the basis of the case where high-frequency wave is incident on the window glass from the normal direction. It is usual that incident direction of high-frequency wave changes when the high-frequency wave is transmitted and received between moving objects, or between a fixed object and a moving object. Incident directions of high-frequency wave also changes in the case of electronic devices such as smartphones like as the case of moving objects. Also, in the case of buildings, the incident direction of high-frequency wave may change depending on the height at which the antenna is installed.

It is an object of the present invention to provide an antenna system capable of suppressing decrease in signal strength due to change in the incident angle of high-frequency wave in an antenna system that is integrated with a glass layer and has excellent transmission characteristics in the GHz band.

The inventors of the present invention investigated the influence of the incident angle of high-frequency wave on a glass layer in an antenna system having the glass layer and a low dielectric layer as previously disclosed in Patent Document 2, and found that the frequency at which highest transmittance is obtained shifts to the higher frequency side where the incident angle is deviated from the normal direction. As a result of examining various conditions that could compensate for the incident angle dependence, the inventors found that high signal strength over a relatively wide range of incident angles can be secured by controlling the thickness of the low dielectric layer within a predetermined range, That is, the present invention can be configured by the following aspects.

Aspect 1

An antenna system to be used at a frequency of 1 GHz or higher, including:

- a laminate including a plurality of high-frequency permeable layers that are mutually in contact at interfaces and respectively transmit high-frequency wave, and
- an antenna circuit board including a high-frequency insulating layer, and disposed adjacent to an outermost high-frequency permeable layer of the laminate, the antenna circuit board receiving the high-frequency wave having been transmitted through the laminate, wherein
- n-th layer of the plurality of high-frequency permeable layers has a thickness Ln within a range of $L_{nmin} \pm \lambda/(10\sqrt{\varepsilon_n})$, where

- n is an integer of 1 or more that is count such that a high-frequency permeable layer through which the high-frequency wave is first transmitted when the high-frequency wave is incident on the laminate is numbered n=1 (same applies below),
- $\varepsilon_n$ denotes a relative dielectric constant of the n-th layer,
- $\lambda$ denotes a wavelength of the high-frequency wave that is incident on the laminate, and
- $L_{nmin}$ denotes a thickness of the n-th layer where an intensity of a reflected wave from the laminate is minimized, the intensity being determined as an intensity of a composite wave of reflected waves from a front surface, a back surface, and joint interfaces of the laminate.

Aspect 2

The antenna system according to Aspect 1, wherein the intensity of the reflected wave from the laminate is a square $As^2$ of an amplitude As that satisfies the following formula (1):

$$A_s \sin(2\pi(x + \Delta x_s)/\lambda = \sum A_n \sin(2\pi(x + \Delta x_n)/\lambda) \quad (1)$$

where $$A_n = (\sqrt{\varepsilon_{n-1}} \cos\theta_{n-1} - \sqrt{\varepsilon_n} \cos\theta_n)/(\sqrt{\varepsilon_{n-1}} \cos\theta_{n-1} + \sqrt{\varepsilon_n} \cos\theta_n)) \prod (1 - A_{n-1}^2)$$

$$\Delta x_n = \Delta x_{n-1} + 2L_{n-1}(\sqrt{\varepsilon_{n-1}} - \sqrt{\varepsilon_1} \sin\theta_1 \sin\theta_{n-1})/\cos\theta_{n-1}$$

$$\sqrt{\varepsilon_{n-1}} \sin\theta_{n-1} = \sqrt{\varepsilon_n} \sin\theta_n$$

where

- $\varepsilon_n$ denotes a relative dielectric constant of the n-th layer constituting the laminate,
- $L_n$ denotes a thickness of the n-th layer constituting the laminate,
- $\theta_n$ denotes a refraction angle of the high-frequency wave that has entered the n-th layer constituting the laminate,
- $\lambda$ denotes a wavelength in air of the high-frequency wave that is incident on the laminate,
- $\varepsilon_0$ denotes a relative dielectric constant in air,
- n denotes an integer of 1 or more,
- $A_0=0$,
- $\Delta x_0=0$,
- $L_0=0$, and
- $\theta_0$=incident angle of the high-frequency wave that is incident on the laminate (first layer of the laminate).

Aspect 3

The antenna system according to Aspect 1 or 2, wherein the intensity of the reflected wave from the laminate is determined for cases where the incident angle of high-frequency wave to the laminate is 400 to 50°.

Aspect 4

The antenna system according to Aspect 1 or 2, wherein the intensity of the reflected wave from the laminate is determined for a case where the incident angle of high-frequency wave on the laminate is 45°.

Aspect 5

The antenna system according to any one of Aspects 1 to 4, wherein the high-frequency permeable layer constituting the laminate includes at least one glass layer, and at least one transmittance adjustment layer formed of a resin layer having a lower dielectric constant than the glass, and where the transmittance adjustment layer is the n-th layer, a thickness of the transmittance adjustment layer falls within the range of $L_{nmin} \pm \lambda/(10\sqrt{\varepsilon_n})$.

Aspect 6

An antenna system according to any one of Aspects 1 to 5, that constitutes window glass of a vehicle or a building.

Aspect 7

The antenna system according to any one of Aspects 1 to 5, that is configured to receive radio waves while being attached to a vehicle, a building or a civil engineering structure.

Aspect 8

A method for manufacturing an antenna system to be used at a frequency of 1 GHz or higher, the antenna system including:

- a laminate including a plurality of high-frequency permeable layers that are mutually in contact at interfaces and respectively transmit high-frequency wave, and
- an antenna circuit board including a high-frequency insulating layer, and disposed adjacent to an outermost high-frequency permeable layer of the laminate, the antenna circuit board receiving the high-frequency wave having been transmitted through the laminate, wherein
- n-th layer of the plurality of high-frequency wave layers is made to have a thickness $L_n$ within a range of $L_{nmin} \pm \lambda/(10\sqrt{\varepsilon_n})$ during producing the antenna system, where

- n is an integer of 1 or more that is count such that a high-frequency permeable layer through which the high-frequency wave is first transmitted when the high-frequency wave is incident on the laminate is numbered n=1 (same applies below),
- $\varepsilon_n$ denotes a relative dielectric constant of the n-th layer,
- $\lambda$ denotes a wavelength of the high-frequency wave that is incident on the laminate, and
- $L_{nmin}$ denotes a thickness of the n-th layer where an intensity of a reflected wave from the laminate is minimized, the intensity being determined as an intensity of a composite wave of reflected waves from a front surface, a back surface, and joint interfaces of the laminate.

Aspect 9

The method for manufacturing an antenna system according to Aspect 8, wherein

- the laminate includes a laminate precursor including at least one glass layer, and at least one transmittance adjustment layer made of a resin layer having a lower relative dielectric constant than the glass layer in the laminate precursor, and
- where the transmittance adjustment layer is the n-th layer, the antenna circuit board is joined with the laminate precursor via the transmittance adjustment layer while controlling a thickness of the transmittance adjustment layer within a range of $L_{nmin} \pm \lambda(10\sqrt{\varepsilon_n})$.

Aspect 10

The method for manufacturing an antenna system according to Aspect 8 or 9, wherein the intensity of the reflected wave from the laminate is a square $As^2$ of an amplitude As that satisfies the following formula (1):

$$A_s \sin(2\pi(x + \Delta x_s)/\lambda = \sum A_n \sin(2\pi(x + \Delta x_n)/\lambda) \quad (1)$$

where $$A_n = (\sqrt{\varepsilon_{n-1}} \cos\theta_{n-1} - \sqrt{\varepsilon_n} \cos\theta_n)/(\sqrt{\varepsilon_{n-1}} \cos\theta_{n-1} + \sqrt{\varepsilon_n} \cos\theta_n)) \prod (1 - A_{n-1}^2)$$

$$\Delta x_n = \Delta x_{n-1} + 2L_{n-1}(\sqrt{\varepsilon_{n-1}} - \sqrt{\varepsilon_1} \sin\theta_1 \sin\theta_{n-1})/\cos\theta_{n-1}$$

$$\sqrt{\varepsilon_{n-1}} \sin\theta_{n-1} = \sqrt{\varepsilon_n} \sin\theta_n$$

where

- $\varepsilon_n$ denotes a relative dielectric constant of the n-th layer constituting the laminate,
- $L_n$ denotes a thickness of the n-th layer constituting the laminate, $\theta_n$ denotes a refraction angle of the high-frequency wave having entered the n-th layer constituting the laminate, $\lambda$ denotes a wavelength in air of the high-frequency wave that is incident on the laminate, $\varepsilon_0$ denotes a relative dielectric constant in air, n denotes an integer of 1 or more, $A_0=0$, $\Delta x_0=0$, $L_0=0$, and $\theta_0$=incident angle of the high-frequency wave that is incident on the laminate (first layer of the laminate).

Aspect 11

The method for manufacturing an antenna system according to any one of Aspects 8 to 10, wherein the intensity of the reflected wave from the laminate is determined for a case where the incident angle of the high-frequency wave on the laminate is 40 to 60°.

Aspect 12

A method for designing the antenna system according to any one of Aspects 1 to 7, including a step of adjusting a thickness of each layer constituting the laminate so that a thickness $L_n$ of the n-th layer falls within a range of $L_{nmin}\pm\lambda/(10\sqrt{\varepsilon_n})$.

Aspect 13

An antenna circuit board to be used in the antenna system according to any one of Aspects 1 to 7.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

According to the present invention, by providing an antenna system with a high-frequency wave antenna circuit board, and providing the antenna circuit board with a high-frequency permeable layer having a predetermined thickness in an antenna system, it becomes possible to inhibit attenuation of high-frequency wave and enhance the transmission characteristics of the antenna circuit board for high-frequency wave of a wide range of incident angles, and exchange large amounts of information.

BRIEF DESCRIPTION OF THE DRAWINGS

In any event, the present invention will be more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, similar reference numerals are used to denote similar parts throughout the several views. The drawings are not necessarily indicated with a constant scale, but are emphasized for illustrating the principles of the invention.

DESCRIPTION OF EMBODIMENTS

Figure 1:
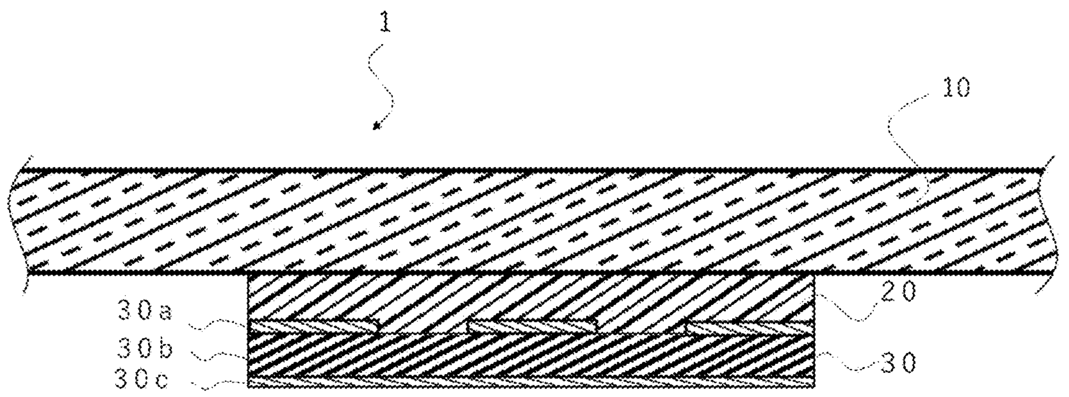
FIG. 1 is a schematic cross-sectional view showing a configuration of an antenna system according to an embodiment of the present invention.

The antenna system of the present invention is an antenna system to be used at a frequency of 1 GHz or higher, and includes a laminate including a plurality of high-frequency permeable layers, and an antenna circuit board that is disposed adjacent to an outermost high-frequency permeable layer of the laminate, and receives high-frequency wave that has permeated through the laminate. The laminate may include, as a high-frequency permeable layer, at least one glass layer, and at least one transmittance adjustment layer having a dielectric constant lower than that of the glass layer (hereinafter, also referred to as low dielectric layer). Here, a state expressed by the phrase “disposed adjacent to” may include a state where an object is disposed in close contact with a surface of another object, a state where an object is adhered to a surface of another object, or a state where an object is disposed to a position close to another object with a space interposed therebetween.

The laminate includes a plurality of high-frequency permeable layers which are joined to each other at their interfaces. High-frequency wave which has been incident on the laminate is reflected from the front surface, back surface, and interfaces of respective layers. In the present invention, the thickness of each layer is adjusted on the basis of the condition which provides minimal intensity (reflection intensity) of the composite wave of these reflected waves. In the laminate formed of a plurality of high-frequency permeable layers, when a relative dielectric constant of the n-th layer (n is an integer of 1 or more) is denoted as $\varepsilon_n$, it is possible to calculate the thickness $L_{nmin}$ of the n-th layer for providing minimal amplitude of composite wave of reflected waves from the wavelength, and the incident angle of the incident wave. In this case, the actual thickness $L_n$ of the n-th layer may be controlled within the range of $L_n=L_{nmin}\pm\lambda/$ ($10\sqrt{\varepsilon_n}$). In the antenna system of the present invention, at least one layer of the high-frequency permeable layers has a thickness within the above-mentioned thickness range. For example, two or more layers may have a thickness within the above-mentioned thickness range, or all layers of the high-frequency permeable layers may have a thickness within the above-mentioned thickness range.

Here, when $A_s$ denotes an amplitude of the composite wave of reflected waves, the reflection intensity is represented by $A_s^2$. In one advantageous aspect, the amplitude $A_s$ satisfies the following formula (1).

$$A_s \sin(2\pi(x + \Delta x_{s)}/\lambda = \sum A_n \sin(2\pi(x + \Delta x_n)/\lambda) \quad (1)$$

where $$A_n = \left(\sqrt{\varepsilon_{n-1}}\cos\theta_{n-1} - \sqrt{\varepsilon_n}\cos\theta_n\right)/\left(\sqrt{\varepsilon_{n-1}}\cos\theta_{n-1} + \sqrt{\varepsilon_n}\cos\theta_n\right)\right) \prod\left(1 - A_{n-1}^2\right)$$

$$x_n = \Delta x_{n-1} + 2L_{n-1}\left(\sqrt{\varepsilon_{n-1}} - \sqrt{\varepsilon_1}\sin\theta_1\sin\theta_{n-1}\right)/\cos\theta_{n-1}$$

$$\sqrt{\varepsilon_{n-1}}\sin\theta_{n-1} = \sqrt{\varepsilon_n}\sin\theta_n$$

where

- $\varepsilon_n$ denotes a relative dielectric constant of the n-th layer constituting the laminate,
- $L_n$ denotes a thickness of the n-th layer constituting the laminate,
- $\theta n$ denotes a refraction angle of high-frequency wave having entered the n-th layer constituting the laminate (incident angle from the n-th layer to the n+1-th layer),
- $\lambda$ denotes a wavelength in air of the high-frequency wave entering the laminate,
- $\varepsilon_0$ denotes a relative dielectric constant in air,
- n denotes an integer of 1 or more,
- $A_0=0$,
- $\Delta x_0=0$,
- $L_0=0$, and
- $\theta_0$=incident angle of the high-frequency wave entering the laminate (first layer of the laminate)

When the laminate includes, for example, N(N is an integer of 2 or more) sheets of high-frequency permeable layers, reflected waves also include a reflected wave from the exit surface of the laminate, and hence, the right side of the formula (1) is the integration of N+1 terms. At that time, for example, when the high-frequency permeable layer and the antenna circuit board in the antenna system are in proximity to each other with an air layer interposed therebetween, $(\varepsilon_{N+1})^{1/2}\cos\theta_{N+1}$ may be defined as $(\varepsilon_0)^{1/2}\cos\theta_0$ in the formula for calculating the amplitude $A_{N+1}$ of the reflected wave.

In the above antenna system, it is preferred that the film thickness $L_{nmin}$ of the n-th layer providing the minimal reflection intensity is calculated while supposing that the incident angle $\theta_0$ of the incident wave on the laminate is 40 to 70°, preferably 40 to 60°, and more preferably 40° to 50°, for example, about 45° (45±2°). As a result of investigation by the present inventors, it was found that the transmittance of high-frequency wave varies depending on the incident angle, that sufficient transmittance is obtained for high-frequency wave of a wide range of incident angles from low to high incident angles by controlling the thickness of the high-frequency permeable layers within a predetermined range on the basis of the layer thickness providing the minimal reflection intensity. At that time, the thickness of the high-frequency permeable layers is preferably controlled for the case where incident angle of the high-frequency wave is inclined from the normal direction.

In addition to the antenna system described above and below, the present invention also encompasses a manufacturing method of the antenna system, and a method for designing the antenna system. In the manufacturing method of the antenna system, the material and the thickness of each layer may be selected so that the above relationship is satisfied depending on the wavelength of the high-frequency wave being used. Also in the design method of the antenna system, the thickness of each layer or the material and the thickness of each layer may be set so that the above relationship is satisfied depending on the wavelength of the high-frequency wave being used. At that time, when another layer has a predetermined thickness and material (relative dielectric constant), adjustment may be made by a transmittance adjustment layer to satisfy the above-described condition. For example, the antenna system may be obtained such that an antenna circuit board is joined to an existing laminate precursor (for example, a single-layer glass plate, or a laminated glass including two layers of glass plates and an interlayer film) with a transmittance adjustment layer interposed therebetween. In this case, the material and the thickness of the transmittance adjustment layer may be determined in accordance with the structure and the material of the existing laminate precursor. For example, using the formula (1), a relationship between the amplitude As of the composite wave, and the thickness of the transmittance adjustment layer as the n-th layer can be shown graphically to determine the value of $L_{nmin}$.

Hereinafter, incident angle dependence of high-frequency wave (high-frequency wave radio wave) received by the antenna system, and a compensation method therefor will be described with reference to the drawings. The following drawings are schematic views for illustration, and the size of each part does not reflect the actual size ratio. In different drawings, common constituents are denoted by the same reference signs, and description thereof will be omitted.

FIG. 1 is a schematic cross-sectional view illustrating an antenna system 1 according to an embodiment of the present invention. The antenna system 1 includes a glass layer (first glass layer) 10, a transmittance adjustment layer 20 having a lower dielectric constant than the glass layer 10, and an antenna circuit board 30. The transmittance adjustment layer 20 is disposed between the glass layer 10 and the antenna circuit board 30 in the thickness direction (vertical direction in the drawing), and one surface of which is joined with the glass layer 10 and another surface of which is joined with the antenna circuit board 30. The transmittance adjustment layer 20 has a relative dielectric constant 62 that is lower than a relative dielectric constant $\varepsilon_1$ of the glass layer 10.

The antenna circuit board 30 includes a circuit layer 30*a*, a high-frequency insulating layer 30*b*, and a conductor layer 30*c*. The antenna circuit board 30 may be a multi-layer circuit board having a plurality of circuit layers and a plurality of insulating layers as described above. Also in the configuration of FIG. 1, the conductor layer 30*c* may have a circuit pattern as necessary. In the configuration shown in FIG. 1, a thickness of the transmittance adjustment layer 20 as discussed below may be understood as a distance from the interface between the glass layer 10 and the transmittance adjustment layer 20 to the interface between the transmittance adjustment layer 20 and the high-frequency insulating layer 30*b*.

Figure 2:
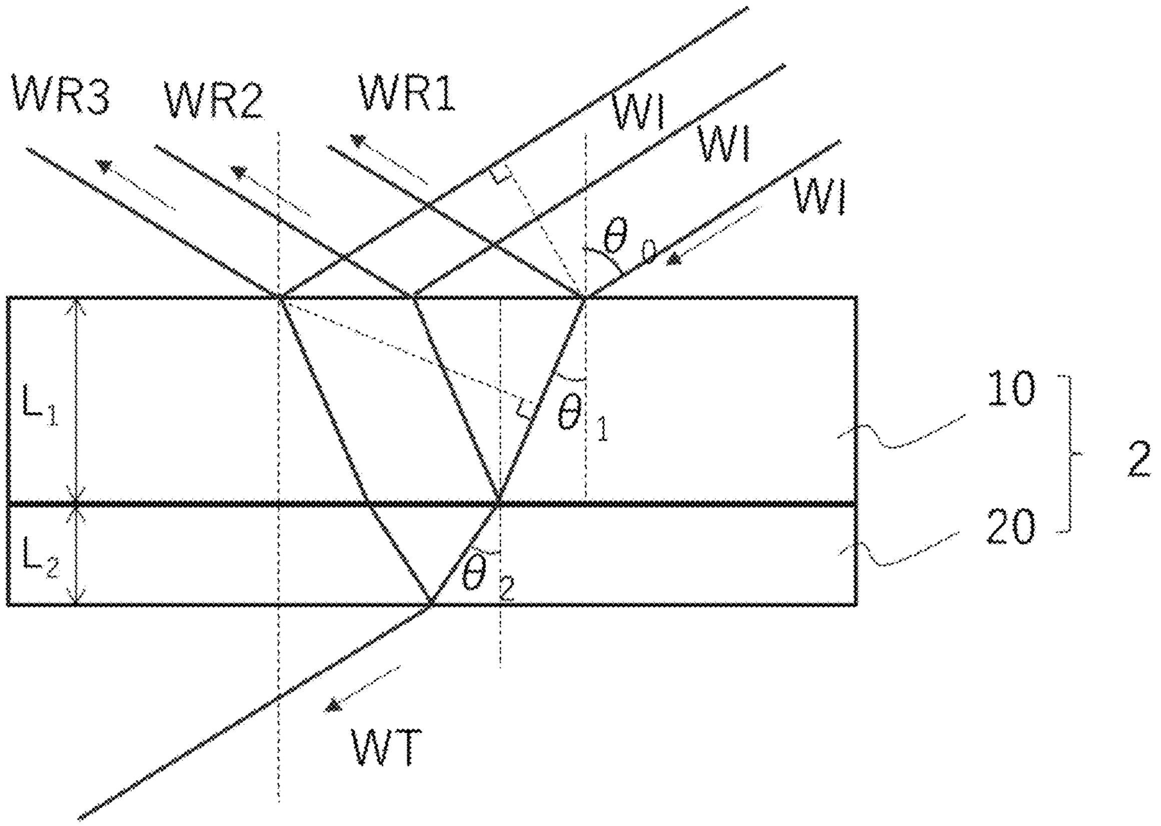
FIG. 2 is a diagram illustrating an optical path (wave path) when high-frequency wave enters a laminate of a glass layer and a transmittance adjustment layer that constitute an antenna system.

FIG. 2 is a diagram for illustrating the incident angle dependence of high-frequency wave permeating through a laminate 2 including the glass layer 10 and the transmittance adjustment layer 20. Incident waves WI having entered the laminate at an incident angle $\theta_0$ (the normal direction being 0 degrees) from outside (upper side of the drawing) are partly reflected as a first reflected wave WR1, and is partly refracted at a refraction angle $\theta_1$ (the normal direction being 0 degrees) and travels inside the glass layer 10. The high-frequency wave is then partly reflected at the interface between the glass layer 10 and the transmittance adjustment layer 20, and emitted from the surface of the glass layer 10 as a second reflected wave WR2. On the other hand, the high-frequency wave having entered the transmittance adjustment layer 20 at a refraction angle $\theta_2$ is partly emitted as a transmitted wave WT from the transmittance adjustment layer 20, and the remaining part of the high-frequency wave is reflected on the surface of the transmittance adjustment layer 20 (interface between the transmittance adjustment layer 2 and the antenna circuit board 3 in the embodiment of FIG. 1) and emitted from the surface of the glass layer 10 as a third reflected wave WR3.

Figure 3:
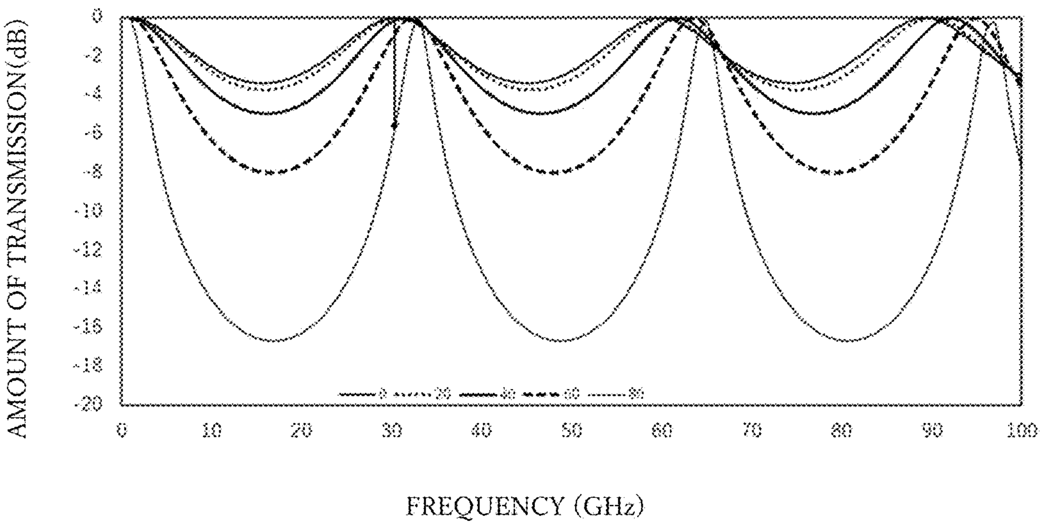
FIG. 3 is a chart showing the incident angle dependence of the amount of high-frequency wave being transmitted through a glass layer.

FIG. 3 is a graph showing the incident angle dependence of the transmission amount of high-frequency wave permeating through the glass layer 10 made of inorganic glass. The graph was derived letting the thickness of the glass be 2 mm and the relative dielectric constant $\varepsilon_1$=6.5. For example, focusing on the frequency of an incident wave of 28 GHz (period N=1), it can be seen that the frequency showing the highest transmittance s shifts to the higher frequency side as the incident angle increases from 0 degrees to 80 degrees. That is, where the high-frequency wave shows highest transmittance when it enters from the normal direction of the glass layer 10 (with an incident angle 0 degrees), as shown by the arrow in the drawing, transmittance of the high-frequency wave decreases with increasing incident angle, lowering the signal strength received by the antenna. Here, the graphs of FIG. 3 and the following FIG. 4 and FIG. 5 were derived using a multilayer plate reflection and transmission coefficient (1D) simulator RT1D Ver.1.2.0.

Figure 4:
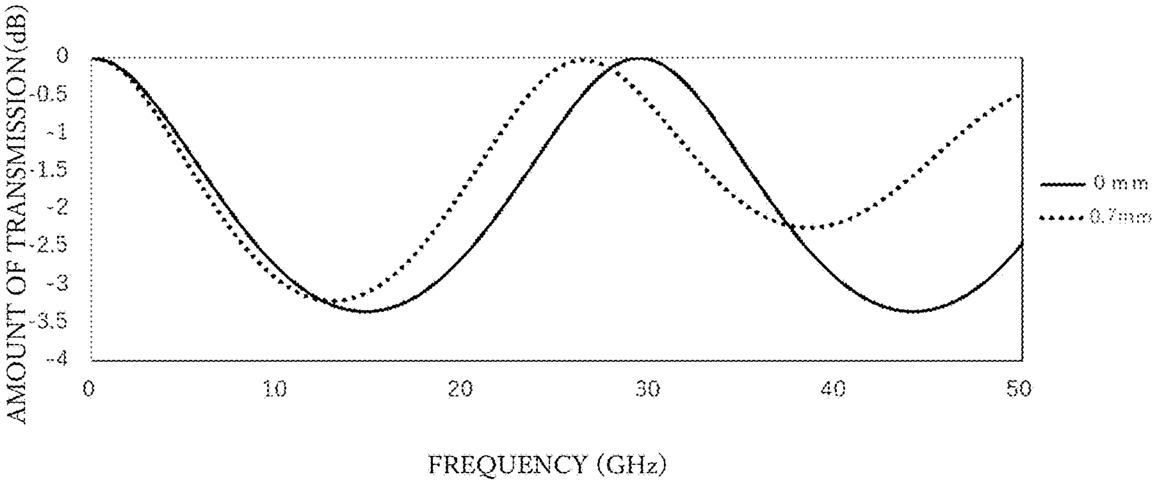
FIG. 4 is a chart showing the relationship between the frequency of high-frequency wave and the transmission amount depending on the thickness of the transmittance adjustment layer.

FIG. 4 is a graph showing the change of transmission amount of the high-frequency wave permeating through the laminate including the glass layer 10 and the transmittance adjustment layer 20 depending on the thickness of the transmittance adjustment layer 20. The graph was drawn letting the thickness of the glass layer 10 be 2 mm, the relative dielectric constant $\varepsilon_1$=6.5, the relative dielectric constant of the transmittance adjustment layer 20 $\varepsilon_2$=2.7, and the incident angle be 0 degrees. Solid line shows a case where the thickness of the transmittance adjustment layer 20 is 0 mm, and the dotted line shows a case where the thickness of the transmittance adjustment layer 20 is 0.7 mm. Compared to the former case, the frequency showing highest permeation (highest transmittance) shifts to low frequency side in the latter case.

Comparison of features shown by FIG. 3 and FIG. 4 reveals that it is possible to compensate for the change in frequency of a transmitted wave WT accompanying change in incident angle θ of high-frequency by adjusting the thickness adjustment of the thickness $L_2$ of the transmittance adjustment layer 20. In the present invention, on the basis of this point of view, conditions for obtaining high transmittance over a relatively wide range of incident angles were determined.

Figure 5:
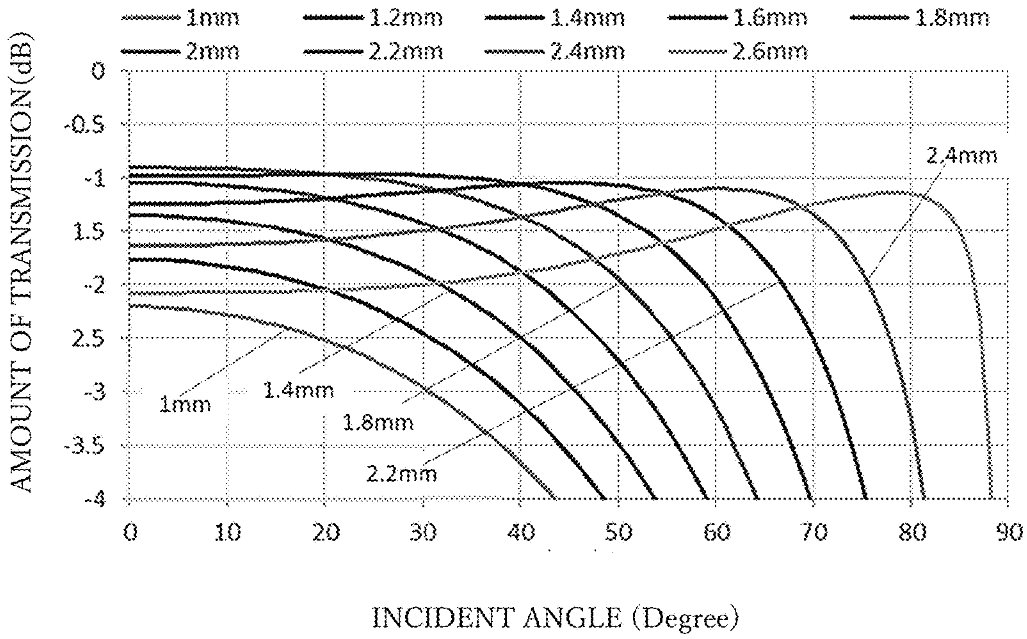
FIG. 5 is a graph showing the incident angle dependence of transmission amount (dB) of the high-frequency wave for each case when the thickness of the transmittance adjustment layer is varied.

FIG. 5 is a graph showing incident angle dependence of high-frequency transmittance (dB) of the transmittance adjustment layers 20 of different thickness $L_2$. In this case, high-frequency wave of 28 GHz is incident on the laminate of the glass layer 10 and the transmittance adjustment layer 20. The optimum values for the thickness $L_2$ of the transmittance adjustment layer 20 are 1.8 mm for an incident angle $\theta_0$ of 0°, 2.2 mm for an incident angle $\theta_0$ of 45°, and 2.4 mm for an incident angle $\theta_0$ of 60°.

Figure 6A:
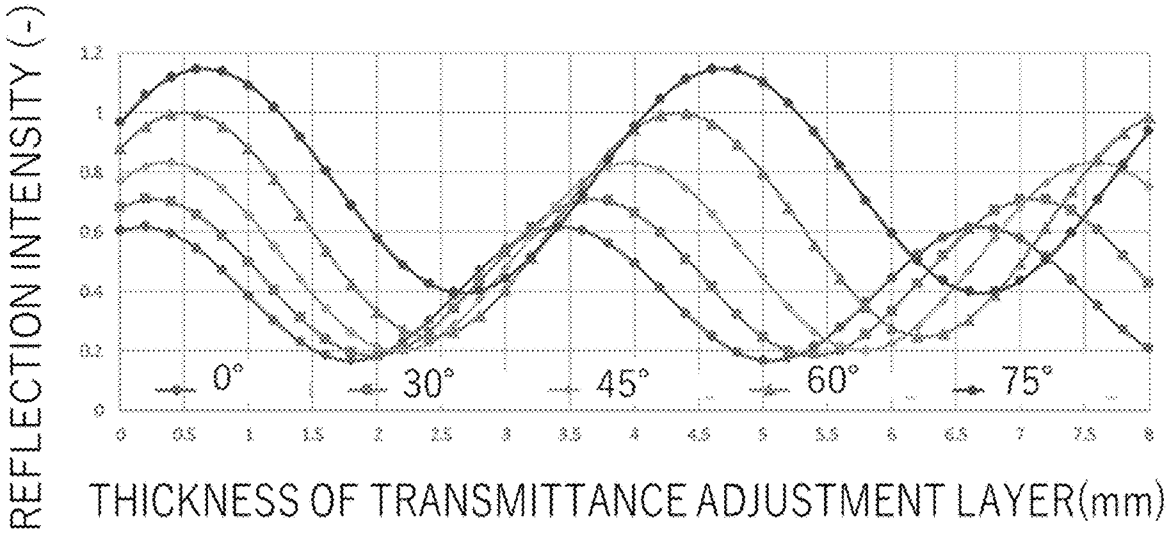
FIG. 6A is a graph showing the thickness dependence of the reflection intensity of high-frequency wave for each case when the incident angle of high-frequency wave is varied.
Figure 6B:
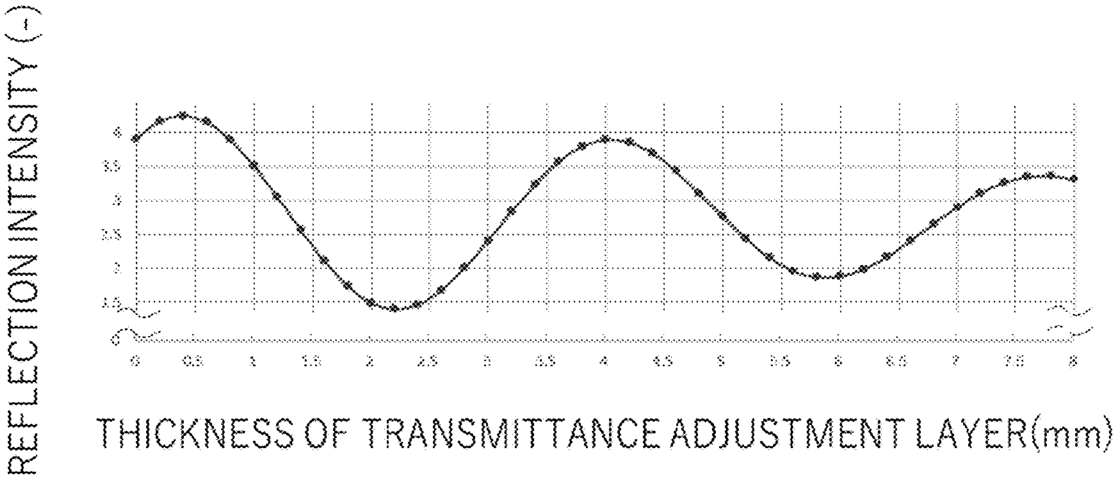
FIG. 6B shows a graph drawn by adding up the graphs for each incident angle shown in FIG. 6A.
Figure 7:
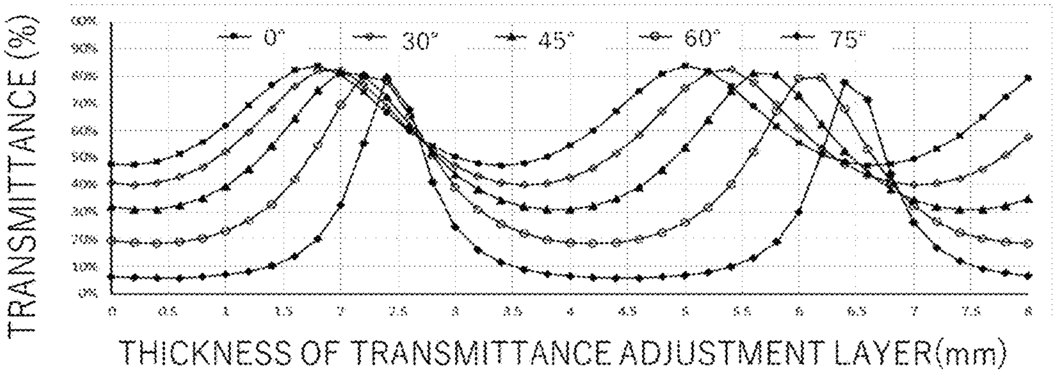
FIG. 7 is a graph showing the result of simulation of transmittance of high-frequency wave being transmitted through the laminate.

Graphs of FIGS. 5 to 7 are derived for the following conditions.

Incident wave WI: frequency f=28 GHz, wavelength λ=10.7 mm, wave speed c=$3.0\times10^8$ m/s.

Glass layer 10: thickness $L_1$=3 mm, relative dielectric constant $\varepsilon_1$=6.5 ($\sqrt{\varepsilon_2}$=2.55).

Transmittance adjustment layer 20: relative dielectric constant $\varepsilon_2$=2.7 ($\sqrt{\varepsilon_2}$=1.64).

Relative dielectric constant in air $\varepsilon_0$=1.0

According to the above formula (1), the optimum thickness $L_2$ of the transmittance adjustment layer 20 can be calculated without using an expensive simulator.

Returning to FIG. 2, when λ denotes a wavelength of the high-frequency wave entering the laminate 2, an amplitude $A_1$ of the first reflected wave WR1, an amplitude $A_2$ of the second reflected wave WR2, and an amplitude $A_3$ of the third reflected wave WR3 can be respectively calculated by the general formula (1) shown above in the following manner.

$$A_1 = ((\varepsilon_0)^{1/2}\cos\theta_0 - (\varepsilon_1)^{1/2}\cos\theta_1)/((\varepsilon_0)^{1/2}\cos\theta_0 + (\varepsilon_1)^{1/2}\cos\theta_1)$$

$$A_2 = (((\varepsilon_1)^{1/2}\cos\theta_1 - (\varepsilon_2)^{1/2}\cos\theta_2)/((\varepsilon_1)^{1/2}\cos\theta_1 + (\varepsilon_2)^{1/2}\cos\theta_2))\cdot(1 - {A_1}^2)$$

$$A_3 = (((\varepsilon_2)^{1/2}\cos\theta_2 - (\varepsilon_0)^{1/2}\cos\theta_3)/((\varepsilon_2)^{1/2}\cos\theta_2 + (\varepsilon_0)^{1/2}\cos\theta_0))\cdot (1 - {A_1}^2)\cdot(1 - {A_2}^2)$$

With respect to the incident angle $\theta_0$, the refraction angles $\theta_1$ and $\theta_2$ can be calculated as follows from Snell's law.

$$\theta_1 = \arcsin(\sin\theta_0/\sqrt{\varepsilon_1})$$

$$\theta_2 = \arcsin(\sin\theta_0/\sqrt{\varepsilon_2})$$

Here, when phase shifts of the first reflected wave WR1, the second reflected wave WR2, and the third reflected wave WR3 from the incident wave are respectively represented by $\Delta x_1$, $\Delta x_2$, and $\Delta x_3$, the phase shifts depend on the optical path difference, and are expressed as follows:

$$\Delta x_1 = 0,$$

$$\Delta x_2 = 2L_1(\varepsilon_0)^{1/2}\cos\theta_1, \text{ and}$$

$$\Delta x_3 = 2L_1(\varepsilon_0)^{1/2}\cos\theta_1 + 2L_2((\varepsilon_2)^{1/2} - (\varepsilon_1)^{1/2}\sin\theta_1\sin\theta_2)/\cos\theta_2.$$

At that time, an intensity $A_s^2$ of a composite wave of reflected waves can be derived from $A_s \sin(2\pi(x+\Delta x_s)\lambda)=\Sigma A_n \sin((2\pi(x+\Delta x_n)\lambda)$ (in this case, n=1, 2, 3) where $A_s$ denotes an amplitude of the composite wave of reflected waves, and $\Delta x_s$ denotes phase shift.

FIG. 6A is a graph showing the reflection intensity ($As^2$) when high-frequency wave with a frequency of 28 GHz is incident on the laminate 2 including the glass layer 10 and the transmittance adjustment layer 20. The thickness (optimum thickness) which provides minimal intensity of the reflected wave exists periodically, and the optimum value of the thickness $L_2$ of the transmittance adjustment layer 20 in the first period is 1.8 mm at the incident angle $\theta_0$ of 0°, and is 2.2 mm and 2.4 mm, respectively at the incident angles $\theta_0$ of 45° and 60°. The optimum value determined here coincides with the simulation results shown in FIG. 5.

FIG. 6B is a graph showing combined intensity of reflection intensities at each incident angle shown in FIG. 6A. In this case, the minimum value of the graph appears when the thickness $L_2$ of the transmittance adjustment layer 20 is around 2.2 mm, which approximately corresponds to the case where the incident angle is 45°.

FIG. 7 is a graph showing the result of simulation of transmittance of high-frequency wave that is transmitted through the laminate 2 under the same conditions. In the following, for simulation of transmittance, a multilayer plate reflection and transmission coefficient (1D) simulator RT1D Ver.1.2.0 was used. This simulation software is available from the website below, and allows calculation of transmittance from inputted relative dielectric constant, thickness, and frequency. http://www.e-em.co.jp/App/RT1D.htm Comparison of FIG. 7 with FIGS. 5 and 6A show that the thickness which provides maximal transmittance for each incident angle matches well with the simulation results in FIG. 5 and the calculation results in FIG. 6A. The multilayer plate reflection and transmission coefficient (1D) simulator is advantageous in practical use because the maximum transmittance after the second period can be determined.

Also from each graph described above, it is understood that the thickness of the transmittance adjustment layer 20 is preferably adjusted on the basis of the case where high-frequency wave incidents obliquely, when the antenna system is used under the circumstance where high-frequency wave incidents from directions other than the normal direction, for example, when the antenna is mounted on a vehicle. The graph shown in FIG. 5 reveals that high transmittance (low reflectance) can be achieved over a relatively wide range of incident angles on the basis of the optimum value of the thickness at $\theta_0=45°$. Generally speaking, a thickness Ln of the n-th layer may be adjusted to a range of, for example, $L_{n45}\pm\lambda/10\sqrt{\varepsilon_n}$, where $L_{n45}$ is the optimum value at an incident angle of 45°.

When the antenna system 1 is incorporated into window glass of a moving object such as an automobile, the incident angle of high-frequency wave may not be constant. In addition, when high-frequency communication is conducted between fixed objects such as window glass of a building and a mobile phone base station, it is not practical to adjust the thickness of the high-frequency permeable layer for each building to which the antenna system is installed. Therefore, in the present invention, the thickness of the high-frequency permeable layer is adjusted on the basis of the thickness which provides maximum transmittance when high-frequency wave enters from a predetermined angle of inclination.

Here, as seen in FIG. 5, the transmittance at $L_2$=2.2 mm, which is the optimum value at an incident angle of 45°, is not significantly different from the transmittance at $L_2$=1.8 mm, which is the optimum value at an incident angle of 0°. The transmittance at an incident angle of 55° is not significantly different from the transmittance at $L_2$=2.4 mm, which is the optimum value at an incident angle of 60°. Also in other angular ranges, significantly high transmittance is obtained compared with the case where the transmittance adjustment layer 20 is absent to the case where $L_2$=1.4 mm. In other words, even when the value is not strictly the optimum value, it is possible to obtain the effect of compensating for the incident angle dependence of the high-frequency transmittance by adjusting the thickness $L_2$ of the transmittance adjustment layer 2. Also from FIG. 6B, it is understood that adjusting $L_2$ on the basis of the optimum value at an incident angle of 45° is advantageous.

In the above description, the case of adjusting the thickness $L_2$ of the transmittance adjustment layer 20 is described. The thickness $L_1$ of the glass layer 1 may also be adjusted if possible. While the graphs of FIGS. 5 to 7 describe the laminate 2 having a two-layer structure, the number of high-frequency permeable layers constituting the laminate 2 is not limited to two, but may be three or more. Generally speaking, a thickness $L_n$ of the n-th layer of the high-frequency layers constituting the laminate may be adjusted to a range of, for example, $L_{n45}\pm\lambda/10\sqrt{\varepsilon_n}$, where $L_{n45}$ denotes an optimum value at an incident angle of 45°.

[Embodiment of Antenna System]

FIGS. 8 to 11 are schematic cross-sectional views illustrating embodiments of the antenna system. In these figures, the laminated structure within the antenna circuit board 30 is not shown for simplicity.

Figure 8:
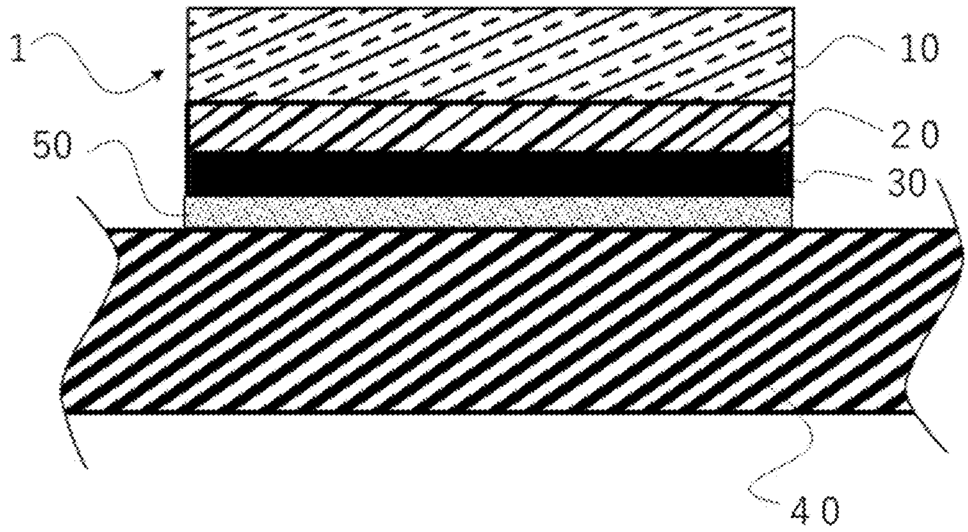
FIG. 8 is a schematic cross-sectional view showing the configuration of an antenna system according to an embodiment of the present invention.
Figure 9:
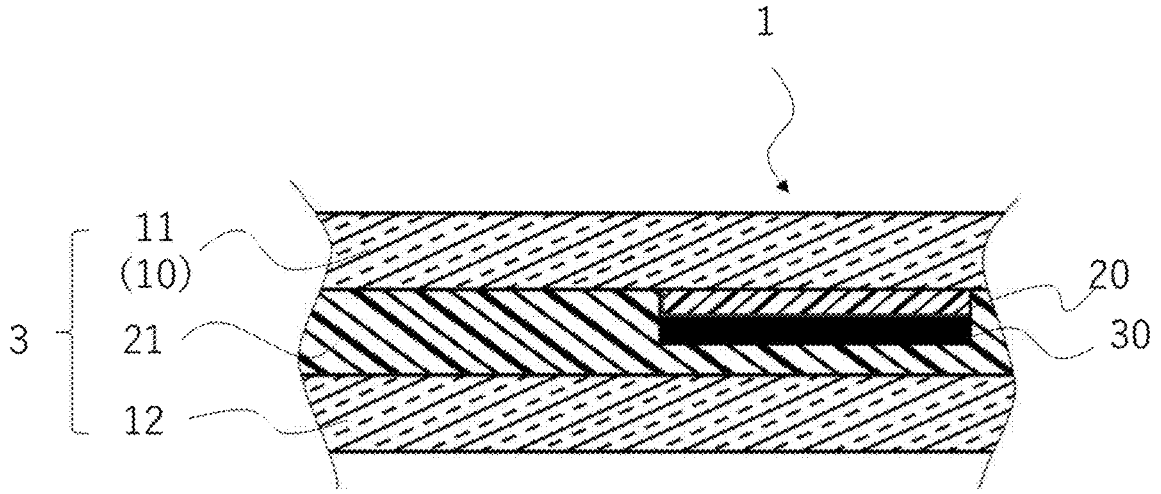
FIG. 9 is a schematic cross-sectional view showing the configuration of an antenna system according to another embodiment of the present invention.

The antenna system 1 according to an embodiment of the present invention may have a configuration as shown in FIG. 1. As shown in FIG. 8, the antenna system 1 may be adhered to the surface of a base body 40 made of glass, resin, or the like directly or via an adhesive layer 50. Alternatively, as shown in FIG. 9, the antenna system 1 of the present invention may be embedded in a laminated glass 3 including a front-side glass layer 11, an interlayer film 21, and a back-side glass layer 12. In this case, the front-side glass layer 11 may be used as the first glass layer 10 of the antenna system 1.

Figure 10:
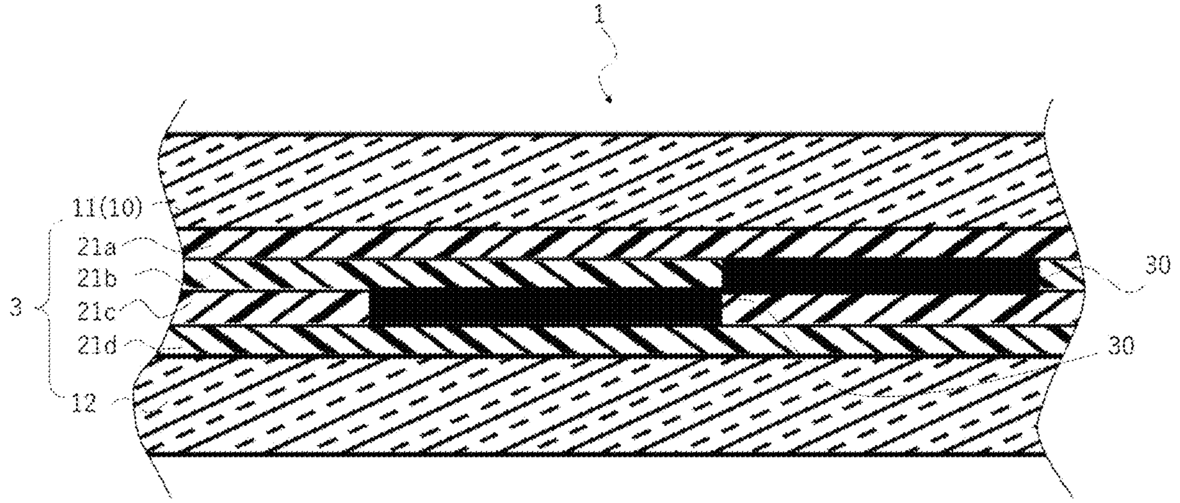
FIG. 10 is a schematic cross-sectional view showing the configuration of an antenna system according to another embodiment of the present invention.

The interlayer film 21 may be made of a different material from or the same material as the transmittance adjustment layer 20. For example, as shown in FIG. 10, the interlayer film 21 (21*a* to 21*d*) of the laminated glass 3 may constitute the transmittance adjustment layer 20 of the antenna system 1. The antenna system 1 may contain transmittance adjustment layers having different thicknesses and may include circuit boards 30 having different distances from the first glass layer 10. In the example shown in FIG. 10, the interlayer film of the laminated glass 3 includes a laminate of a first intermediate layer 21*a*, a second intermediate layer 21*b*, a third intermediate layer 21*c*, and a fourth intermediate layer 21*d*, and the first intermediate layer 21*a* constitutes the transmittance adjustment layer between the first glass layer 10 and the circuit board 3*a*, and the first intermediate layer 21*a* and the second intermediate layer 21*b* constitute the transmittance adjustment layers between the first glass layer 10 and the circuit board 30*b*.

Figure 11:
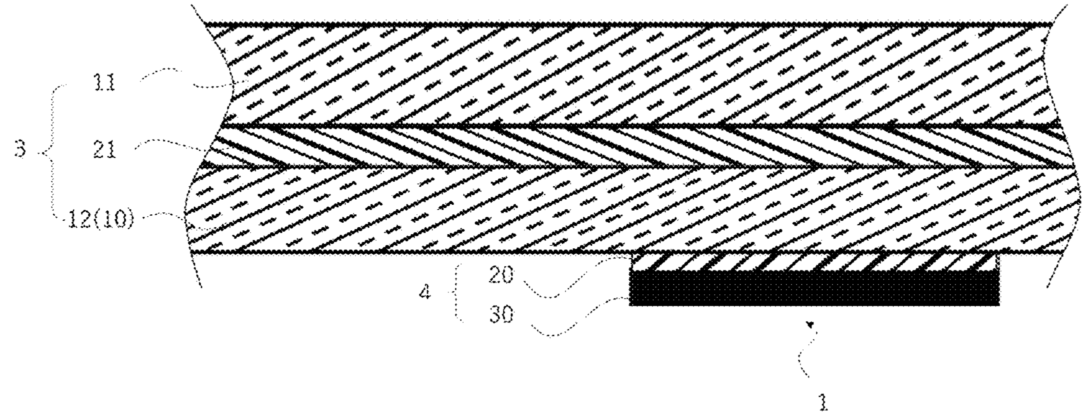
FIG. 11 is a schematic cross-sectional view showing the configuration of an antenna system according to another embodiment of the present invention.

As shown in FIG. 11, the circuit board 30 of the antenna system 1 may be layered on the back face of the laminated glass 3 with the transmittance adjustment layer 20 interposed therebetween. In this case, the first glass layer 10 joined with the transmittance adjustment layer 20 in the antenna system 1 is the back-side glass layer 12 of the laminated glass 3. In this case, the front-side glass layer 11 and the interlayer film 21 of the laminated glass 3 may also be regarded as parts of the antenna system 1. Also in the configuration shown in FIG. 11, it has been ascertained by simulation and calculation that decrease in transmittance depending on the incident angle can be suppressed by providing the transmittance adjustment layer 20 on the back side of the laminated glass 3, and that and high transmittance of high-frequency wave can be obtained for incident angles of 40 degrees or more while suppressing decrease in transmittance at low incident angles by adjusting the thickness of the transmittance adjustment layer 20 to the thickness which provides highest transmittance where the incident angle is inclined. In the embodiment shown in FIG. 11, the front-side glass layer 11, the interlayer film 21, the first glass layer 10 (the back-side glass layer 12), and the transmittance adjustment layer 20 constitute the high-frequency permeable layers, and these are the first layer to the fourth layer of the high-frequency permeable layers in this order.

For example, the antenna system 1 shown in FIG. 11 may also be produced by adhering a laminate 4 of the circuit board 30 and the transmittance adjustment layer 20 to a typical laminated glass 3. The laminate 4 for antenna system as an intermediate body is also included in the present invention.

In the antenna system of the present invention, target frequency of the high-frequency wave is, for example, 1 GHz or higher, and preferably 2 GHz or higher. In the antenna system of the present invention, target frequency of the high-frequency wave may be, for example, 5 to 6 GHz (for example, 5.8 GHz), more preferably 6 GHz or higher, and further preferably 10 GHz or higher. The upper limit of the frequency is not particularly limited, but may be, for example, 400 GHz or lower, preferably 300 GHz or lower. As an example, target frequency of high-frequency wave in the antenna system of the present invention may be 10 GHz or higher and 100 GHz or lower, for example, around 28 GHz (26 to 30 GHz, for example 28 GHz).

As illustrated in FIG. 10, a plurality of antenna circuit boards 30 may be provided in one antenna system 1. In this case, the antenna system 1 may be a multi-band compatible antenna system 1 that includes a high-frequency wave incompatible antenna circuit board (not shown) that targets radio waves with frequencies of less than 1 GHz.

The antenna system 1 may be incorporated into, for example, window glass of a building, or may be incorporated into glass (windshield, side glass, rear glass, sunroof) of a moving object such as an automobile or train. For example, when visibility is required, such as in window glass or automobile glass, it is preferred to arrange the antenna system circuit board 30 in a part that does not obstruct the view.

[Glass Layer]

The thickness $L_1$ of the first glass layer 10 may be appropriately set depending on the application of an object which includes the first glass layer 10, and may be, for example, about 0.5 to 20 mm, preferably about 1 to 15 mm, and more preferably about 1.5 to 10 mm. When the first glass layer 10 is window glass of a building, the thickness may be relatively large. However, when the first glass layer 10 is a surface layer of the antenna system 1 as shown in FIG. 8, the thickness may be small from the viewpoint of weight reduction, and the thickness $L_1$ may be, for example, about 0.5 to 7 mm, preferably about 0.7 to 5 mm, and more preferably about 0.8 to 3 mm.

In the embodiment shown in FIG. 11, the first glass layer 10 joined with the transmittance adjustment layer 20 in the antenna system 1 is the back-side glass layer 12 of the laminated glass 3. Also, the thickness of the second glass layer may be appropriately set depending on the application of the object which is equipped with the laminated glass 3. For example, the thickness of the second glass layer may be about 0.5 to 20 mm, preferably about 1 to 15 mm, and more preferably about 1.5 to 10 mm.

The shape of the first glass layer 10 is not particularly limited as long as the high-frequency wave which has permeated through the first glass layer 10 can reach the antenna circuit board via the transmittance adjustment layer. For example, the first glass layer 10 may have a shape of planar glass such as flat planar glass or curved planar glass.

The materials for the first and second glass layers are not particularly limited as long as they are materials commonly used for window glass. The materials may be organic glass of various transmittance such as transparent or translucent acryl glass, polycarbonate glass, or the like. However, from the viewpoint of weatherproof and transparency, inorganic glass such as soda lime glass, boric acid glass, borosilicate glass, aluminosilicate glass, and quartz glass is preferred. According to the classification based on alkali components, alkali-free glass and low-alkali glass may be used. The content of an alkali metal component (for example, $Na_2O$, $K_2O$, $Li_2O$) of the above-described glass is preferably 15% by weight or less, and more preferably 10% by weight or less.

Any suitable method can be used to form these glass layers depending on the shape and material of the glass. Typically, the above-described glass is prepared by melting a mixture containing a main raw material such as silica or alumina, a defoaming agent such as mirabilite or antimony oxide, and a reducing agent such as carbon at a temperature of 1400° C. to 1600° C., and shaping into a thin plate, followed by cooling. Examples of the method for forming thin plate of the above-described glass include a slot down-draw method, a fusion method, and a float method. Where necessary, after shaping the glass into a predetermined shape such as a plate shape by these methods, the glass may be subjected to thinning, or anti-glare treatment or the like to provide an uneven surface. Alternatively, the glass may be subjected to chemical polishing by a solvent such as hydrofluoric acid so as to enhance the smoothness or the like.

The first and second glass layers may be, for example, window glass of vehicles (for example, window glass for vehicles such as cars, trains, airplanes, ships, etc.) or window glass of buildings.

Further, the second glass layer may be combined with the first glass layer to dispose the antenna circuit therebetween. The second glass layer is typically a glass member disposed to face the first glass layer in the thickness direction. The second glass layer and the first glass layer may be made of the same material or of different materials.

The first and second glass layers may include a colored region, and the antenna circuit in the antenna circuit board may be arranged within the colored region. The first and/or second glass layer may have a colored area partially (for example, in the edge area), especially when visibility is required, such as in window glass or glass for vehicles.

[Transmittance Adjustment Layer]

The transmittance adjustment layer (low dielectric layer) has a lower dielectric constant (relative dielectric constant) than the first glass layer, and has the role of making high-frequency wave incident on the first glass layer reach the antenna circuit board. The low dielectric layer has a lower dielectric constant than the first glass layer when compared at the same frequency.

As a specific value, for example, at a frequency of 28 GHz, the relative dielectric constant εf of the low dielectric layer compared with the relative dielectric constant εg of the first glass layer may be, for example, εg−5 to εg−0.1, preferably εg−4.5 to εg−0.5, and more preferably εg−4 to εg−1.5.

The measurement of the dielectric properties (relative dielectric constant and dielectric loss tangent) is preferably carried out by the microstrip line method that allows measurement of the dielectric constant in the thickness direction. In the case of isotropic materials, dielectric properties in the plane direction measured by the Fabry-Perot method may be used as a substitute for the dielectric constant. In this case, the Fabry-Perot resonator (Model No. DPS03) can be used to perform measurements at 28 GHz (25° C.) according to JIS R 1660-2. This method allows measurement with very high precision in both of one direction and the direction perpendicular to the one direction (X-Y directions) in the plane. This method enables highly precise measurement even when the object has low tan δ.

In one aspect, for example, at a frequency of 28 GHz, the relative dielectric constant εg of the first glass layer may be 5.5 to 7.5, preferably 5.8 to 7.3, and more preferably 6.0 to 7.0, and the relative dielectric constant εf of the low dielectric layer may be, for example, 2.0 to 4.0, preferably 2.2 to 3.5, and more preferably 2.4 to 3.0.

In one aspect, for example, at a frequency of 28 GHz, the dielectric loss tangent tan δg of the first glass layer may be 0.05 or less, preferably 0.03 or less, and more preferably 0.02 or less, and the dielectric loss tangent tan δf of the low dielectric layer may be, for example, 0.05 or less, preferably 0.03 or less, and more preferably 0.01 or less.

In one aspect, the relative dielectric constant and the dielectric loss tangent of the second glass layer can take the same values as the first glass layer.

In the present invention, the thickness of the low dielectric layer 20 is controlled as described above. For this purpose, the low dielectric layer 20 may be a single layer. Alternatively, a laminate of two or more thin layers may be used as the low dielectric layer 20.

In one aspect, the thickness $L_2$ of the low dielectric layer may be selected from a wide range of about 1 μm to 20.0 mm within the range of $L_{nmin}\pm\lambda/(10\sqrt{\varepsilon_2})$.

The low dielectric layer (transmittance adjustment layer) is not particularly limited as long as it has a predetermined dielectric constant and can be in contact with the first glass layer. For example, the low dielectric layer may be made of thermoplastic resin or thermosetting resin having a predetermined dielectric constant.

In an aspect, it is preferred that the low dielectric layer is an adhesive low dielectric layer having adhesive property so that the interface between the first glass layer and the low dielectric layer and the interface between the low dielectric layer and the antenna circuit board can be easily brought into close contact with each other. The low dielectric layer may adhere to the first glass layer, or may adhere to the antenna circuit board, and preferably may adhere to both of the first glass layer and the antenna circuit board.

When the low dielectric layer has thermal bonding property, the low dielectric material may be fused to bond the antenna circuit board and the first glass together via the fused material of the low dielectric layer. Alternatively, when the solution of the low dielectric layer material dissolved in a solvent has adhesive property, the solution of low dielectric layer material may be applied to the joining surface of the first glass and/or the antenna circuit board to bond the antenna circuit board and the first glass together via adhesion to the low dielectric layer material.

Preferably, the fusion or adhesion (hereinafter referred to as fusion or the like) is preferably carried out under degassing and/or reduced pressure from the viewpoint of preventing mingling of air. Degassing may be performed by physically pushing air out of the joining interface.

In the fusion or the like, the antenna circuit board and the low dielectric material may be preliminarily fused or adhered to form a laminate, and then the laminate and the first glass may be fused under degassing and/or reduced pressure.

Examples of the adhesive low dielectric layer include polyvinyl acetal resin, olefin-vinyl carboxylate copolymer resin, ionomer resin, acrylic resin, urethane resin, vinyl chloride resin, fatty acid polyamide, polyester resin, silicone elastomer, epoxy resin, and polycarbonate (these materials will be described later) having good affinity for glass materials such as inorganic glass and resin glass. If the adhesive low dielectric layer can be adhered by thermo-pressure bonding, it is possible to inhibit circuit breakage or deformation during the adhesion, and it is also possible to inhibit foaming and peeling even if the glass base material is a curved glass such as an automobile windshield. Furthermore, when the antenna system is formed as a laminated glass such that a high-frequency antenna circuit board is embedded between glass base materials, lamination can be performed under typical manufacturing conditions for laminated glass, so that extra steps can be omitted.

(Antenna Circuit Board)

The antenna circuit board 30 preferably includes at least one circuit layer 30*a* and at least one high-frequency insulating layer 30*b*, and the form thereof is not particularly limited. The antenna circuit board 30 can be used as various high-frequency circuit boards by known or commonly used means. FIG. 1 shows the antenna circuit board including the circuit layer 30*a*, the high-frequency insulating layer 30*b*, and the conductor layer 30*c*.

Figure 12:
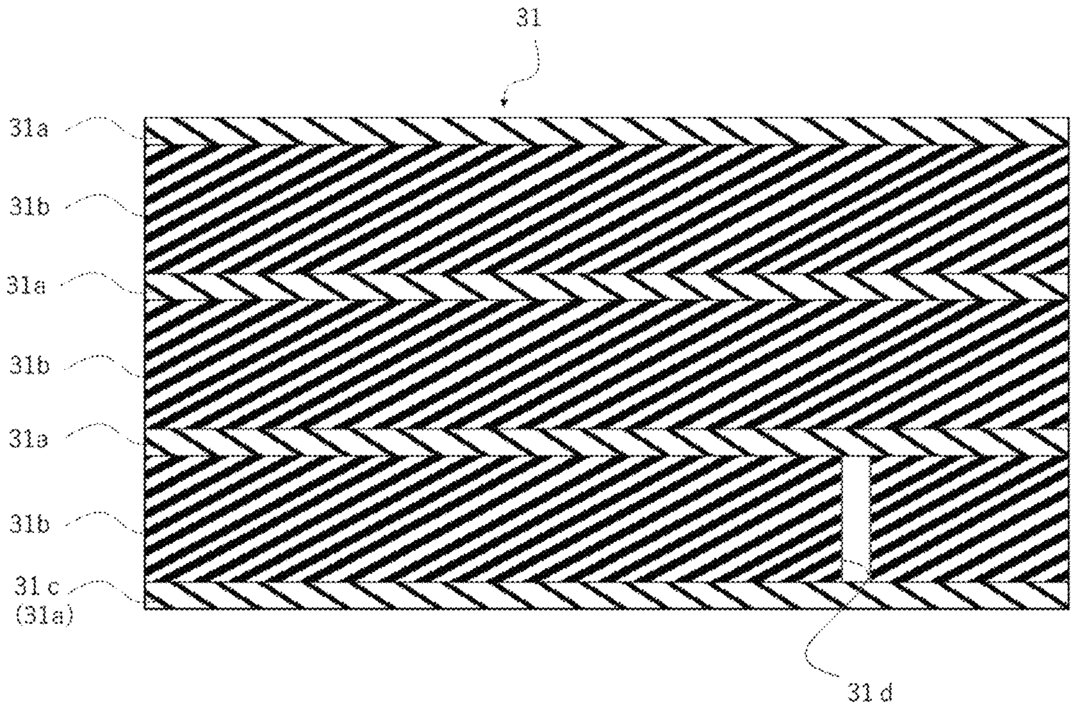
FIG. 12 is a schematic cross-sectional view for illustrating the configuration of a laminated circuit board included in the antenna system.

As shown in the schematic cross-sectional view of FIG. 12, another antenna circuit board 30 may be a laminated circuit board including a plurality of circuit layers 31*a* (including a conductor layer 31*c*), a plurality of insulating layers 31*b*, and, if necessary, a via (hole for conduction) 31*d* provided between different circuit layers 31*a*.

The antenna circuit board 30 may be a circuit board (or a semiconductor device mounting board) on which a semiconductor device (for example, an IC chip: not shown) is mounted. The antenna circuit board 30 may be connected to, for example, a transmitting/receiving device (not shown) or the like via a conductive band (not shown).

The antenna circuit board 30 is capable of receiving high-frequency electromagnetic waves targeted by the antenna system 1 described above. Furthermore, it is preferred that the antenna circuit board 30 can transmit these high-frequency waves.

The circuit layer may be made of, for example, at least a conductive metal, and may have a circuit which is formed using a known circuit processing method. The conductor forming the circuit layer may be made of various conductive metals, for example, gold, silver, copper, iron, nickel, aluminum, or alloy metals thereof.

The antenna circuit board may include a conductor layer such as a ground layer in addition to the circuit layer. The conductor layer 30*c* may be made of various conductive metals, for example, gold, silver, copper, iron, nickel, aluminum, or alloy metals thereof. The conductors constituting the circuit layer and the conductor layer may be the same or different.

The antenna circuit board may be used for various transmission lines, for example, known or commonly used transmission lines such as coaxial lines, strip lines, microstrip lines, coplanar lines, and parallel lines, or for antennas (for example, antenna for microwave or millimeter wave). The circuit board may be used in an antenna device in which an antenna and a transmission line are integrated.

As long as a high-frequency insulating layer is used, the antenna structure may have any known or commonly used structure, and examples include antennas that use millimeter waves or microwaves, for example, a waveguide slot antenna, a horn antenna, a lens antenna, a chip antenna, a pattern antenna, a printed antenna, a triplate antenna, a microstrip antenna, and a patch antenna. The antenna circuit board (or semiconductor device mounting board) may be used in various sensors, especially in an vehicle-m radar.

The high-frequency antenna circuit board may be compatible with data transmission rates of 10 gigabits per second or more. For example, the high-frequency antenna circuit board may be a circuit board compatible with 5G and next generation.

Although the area of the antenna circuit board is not limited, for example, the antenna circuit board may have a size of 5 cm×5 cm or about 3 cm×3 cm, or the antenna circuit board may have an area of 25 $cm^2$ or less, preferably 20 $cm^2$ or less, and more preferably as small as 10 $cm^2$ or less. The lower limit is not particularly limited as long as it is operable as an antenna system, but may be, for example, about 1 $cm^2$.

(High-Frequency Insulating Layer)

It is preferred that the antenna circuit board includes a high-frequency insulating layer. Although the high-frequency insulating layer is not particularly limited as long as it is an insulating layer that can reduce the transmission loss of electrical signals in a high-frequency circuit, examples thereof include insulating layers made of heat-resistant resin such as thermoplastic liquid crystal polymer (LCP), polyimide (PI) (especially, modified polyimide (MPI)), polyethylene naphthalate (PEN), polyether ether ketone (PEEK) and the like. Among these examples, an insulating layer made of polyimide is preferably employed because of its excellent heat resistance and excellent chemical resistance. Thermoplastic liquid crystal polymer is preferably employed in terms of its excellent dielectric properties.

For example, the insulating layer may be made of a thermoplastic liquid crystal polymer film or a polyimide film. In this case, an antenna circuit board can be obtained by providing a circuit layer or the like on the thermoplastic liquid crystal polymer film or the polyimide film. The material of the high-frequency insulating layer will be described later.

The thickness of the insulating layer 30*b* in the antenna circuit board 30 can be set to appropriate value depending on the required antenna performance and the like. For example, the thickness may be selected from a wide range from 10 μm to 2.5 mm. For example, the thickness may be about 0.1 to 2.5 mm, preferably about 0.3 to 2.0 mm, and more preferably about 0.3 to 1.0 mm. When the antenna circuit board is a multilayer circuit board, the thickness of the insulating layer denotes the whole thickness of the insulating layers (or the total thickness of all the insulating layers) constituting the multilayer circuit board.

The relative dielectric constants εp in both of one direction and the direction perpendicular to the one direction in a plane of the high-frequency insulating layer may be, for example, 2.0 to 4.0, preferably 2.2 to 3.5, and more preferably 2.4 to 3.0 at a frequency of 28 GHz.

The relative dielectric constant εf of the low dielectric layer and the relative dielectric constant εp of the high-frequency insulating layer may satisfy εf/εp=30/70 to 60/40, preferably 35/65 to 60/40, and more preferably 38/62 to 55/45.

The dielectric loss tangent tan δp in both of one direction and the direction perpendicular to the one direction in a plane of the high-frequency insulating layer may be, for example, 0.010 or less, preferably 0.005 or less, and more preferably 0.003 or less at a frequency of 28 GHz. Here, the dielectric properties are values measured by the above-described method.

[Method of Manufacturing Antenna System]

The antenna system can be manufactured in accordance with the method described in the examples of Patent Document 2, except that the control range of the thickness of the transmittance adjustment layer 20 is different.

A circuit is formed by thermo-pressure bonding a copper foil on both surfaces of an insulating film, and removing part of the copper foil by etching. A multilayer circuit board can be obtained by repeating pressure bonding of an insulating film and a copper foil, and etching. The antenna circuit board thus formed, a separately prepared low dielectric film, and glass are layered, and made into a laminate using a vacuum laminator or vacuum bag or the like to obtain an antenna system having a desired structure. A specific example of the manufacturing method will be described later.

[Materials of Transmittance Adjustment Layer]

Hereinafter, materials that can be suitably used for the transmittance adjustment layer (low dielectric layer) 20 described above will be described.

(Polyvinyl Acetal Resin)

Examples of the polyvinyl acetal resin include polyvinyl acetal resins produced by acetalizing vinyl alcohol resins such as polyvinyl alcohol or vinyl alcohol copolymers.

Where the low dielectric layer contains polyvinyl acetal resin, the low dielectric layer may contain only one type of polyvinyl acetal resin, or two or more types of polyvinyl acetal resins that are different in one or more of viscosity average degree of polymerization, degree of acetalization, amount of acetyl groups, amount of hydroxyl groups, ethylene content, molecular weight of aldehyde used for acetalization, and chain length. Where two or more different types of polyvinyl acetal resins are contained, a mixture of two or more polyvinyl acetal resins that are different in one or more of viscosity average degree of polymerization, degree of acetalization, amount of acetyl groups, and amount of hydroxyl groups is preferred from the viewpoint of. e.g., satisfactory moldability of molten resin.

The polyvinyl acetal resin used in the present invention can be obtained by a known or commonly used method. For example, an aldehyde (or ketone) and an acid catalyst are added to an aqueous solution of polyvinyl alcohol or a vinyl alcohol copolymer to cause acetalization reaction. Next, after filtering the reaction solution as necessary, neutralization is conducted by adding a neutralizing agent such as an alkali. The resultant resin is filtered, washed with water, and dried to obtain a polyvinyl acetal resin.

Polyvinyl alcohol can be obtained by saponifying a polyvinyl ester obtained by polymerizing a vinyl ester compound, and a vinyl alcohol copolymer can be obtained by saponifying a copolymer of a vinyl ester compound and other monomer.

Examples of vinyl ester compounds include aliphatic vinyl carbonates such as vinyl acetate, 1-propenyl acetate, 1-methylvinyl acetate, 1-butenyl acetate, 2-methyl-1-propenyl acetate, vinyl propionate, vinyl butanoate, vinyl pivalate, vinyl versatate, vinyl pentanoate, vinyl hexanoate, vinyl octanoate, vinyl decanoate, vinyl dodecanoate, vinyl hexadecanoate, and vinyl octadecanoate, and aromatic vinyl carbonates such as vinyl benzoate. These vinyl ester compounds may be used alone or in combination. Among these vinyl ester compounds, vinyl acetate is preferred from the viewpoint of productivity.

Examples of other monomers include: α-olefins such as ethylene, propylene, n-buthene, and isobutylene; acrylic acids and salts thereof; esters of acrylic acid such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acids and salts thereof; esters of methacrylic acid such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide; acrylamide derivatives such as N-methylacrylamide, N-ethylacrylamide, N,N-dimethylacrylamide, diacetoneacrylamide, acrylamide propanesulfonic acid and a salt thereof, acrylamide propyldimethylamine and a salt or a quaternary salt thereof, and N-methylolacrylamide and derivatives thereof; methacrylamide, methacrylamide derivatives such as N-methylmethacrylamide, N-ethylmethacrylamide, methacrylamide propanesulfonic acid and a salt thereof, methacrylamide propyldimethylamine and a salt or a quaternary salt thereof, and N-methylolacrylamide and derivatives thereof; vinyl ethers such as methylvinyl ether, ethylvinyl ether, n-propylvinyl ether, i-propylvinyl ether, n-butylvinyl ether, i-butylvinyl ether, t-butylvinyl ether, dodecylvinyl ether, and stearylvinyl ether; nitriles such as acrylonitrile and methacrylonitrile; vinyl halides such as vinyl chloride and vinyl fluoride; vinylidene halides such as vinylidene chloride and vinylidene fluoride; allyl compounds such as allyl acetate and allyl chloride; unsaturated dicarboxylic acids such as maleic acid, itaconic acid and fumaric acid and salts, esters or anhydrides thereof; and vinylsilyl compounds such as vinyltrimethoxysilane. Such other monomers may be used alone or in combination of two or more. Among these, ethylene is preferred as the other monomer.

The acid catalyst used in the acetalization reaction is not particularly limited, and organic acids and inorganic acids may be used, and examples of such acids include acetic acid, paratoluenesulfonic acid, nitric acid, sulfuric acid, and hydrochloric acid. Among these, hydrochloric acid, sulfuric acid, and nitric acid are preferred from the viewpoint of acid strength and ease of removal at the time of washing.

The aldehyde (or ketone) used in production of polyvinyl acetal resin is preferably a linear, branched, or cyclic, and more preferably linear or branched compound having 1 to 10 carbon atoms. This results in correspondingly linear or branched acetal side chains. Further, the polyvinyl acetal resin used in the present invention may be obtained by acetalizing polyvinyl alcohol or vinyl alcohol copolymer with a mixture of a plurality of aldehydes (or ketones). Polyvinyl alcohol or vinyl alcohol copolymer may be composed of only one of them, or may be a mixture of polyvinyl alcohol and vinyl alcohol copolymer.

Examples of the aldehyde include aliphatic, aromatic, and alicyclic aldehydes such as formaldehyde, acetaldehyde, propionaldehyde, n-butyraldehyde, isobutyraldehyde, valeraldehyde, isovaleraldehyde, n-hexylaldehyde, 2-ethylbutyraldehyde, n-heptylaldehyde, n-octylaldehyde, 2-ethylhexylaldehyde, n-nonylaldehyde, n-decylaldehyde, benzaldehyde, and cinnamaldehyde. Among these, aliphatic unbranched aldehydes having 2 to 6 carbon atoms are preferred, and n-butyraldehyde is particularly preferred from the viewpoint of easily obtaining polyvinyl acetal resin having suitable breaking energy. These aldehydes may be used alone or in combination of two or more. Furthermore, a polyfunctional aldehyde or an aldehyde having another functional group may be used in combination in an amount of 20% by mass or less of all aldehydes. When n-butyraldehyde is used, the content of n-butyraldehyde in the aldehydes used for acetalization is preferably 50% by mass or more, more preferably 80% by mass or more, even more preferably 95% by mass or more, particularly preferably 99% by mass or more, and may be 100% by mass.

The viscosity average degree of polymerization of polyvinyl alcohol, which is a raw material for polyvinyl acetal resin, is preferably 100 or more, more preferably 300 or more, more preferably 400 or more, further preferably 600 or more, particularly preferably 700 or more, and most preferably 750 or more. When a polyvinyl acetal resin composition containing a relatively large amount of plasticizer (for example, 20 parts by mass or more) is used, the viscosity average degree of polymerization of polyvinyl alcohol, which is a raw material for the polyvinyl acetal resin, is preferably 500 or more, more preferably 900 or more, more preferably 1000 or more, further preferably 1200 or more, particularly preferably 1500 or more, and most preferably 1600 or more.

Further, the viscosity average degree of polymerization of polyvinyl alcohol is preferably 5000 or less, more preferably 3000 or less, further preferably 2500 or less, particularly preferably 2300 or less, and most preferably 2000 or less.

The viscosity average degree of polymerization of polyvinyl alcohol can be measured, for example, according to "Polyvinyl alcohol test method" of JIS K 6726.

Usually, since the viscosity average degree of polymerization of polyvinyl acetal resin coincides with the viscosity average degree of polymerization of polyvinyl alcohol as the raw material, the preferred viscosity average degree of polymerization of polyvinyl alcohol mentioned above coincides with the preferred viscosity average degree of polymerization of polyvinyl acetal resin. When the low dielectric layer includes two or more different polyvinyl acetal resins, the viscosity average degree of polymerization of at least one polyvinyl acetal resin is preferably not lower than the lower limit value and not higher than the upper limit value.

The amount of acetyl groups in the polyvinyl acetal resin constituting the low dielectric layer may be preferably 0.01 to 20% by mass, more preferably 0.05 to 10% by mass, and further preferably 0.1 to 5% by mass, based on the ethylene unit of the polyvinyl acetal main chain. The amount of acetyl groups in the polyvinyl acetal resin can be adjusted by appropriately adjusting the degree of saponification of the raw material polyvinyl alcohol or vinyl alcohol copolymer. When the low dielectric layer includes two or more different polyvinyl acetal resins, the amount of acetyl groups of at least one polyvinyl acetal resin preferably falls within the above range.

The degree of acetalization of the polyvinyl acetal resin used in the present invention is not particularly limited, but is preferably 40 to 86 mol %, more preferably 45 to 82 mol %, further preferably 50 to 78 mol %, particularly preferably 60 to 74 mol %, and most preferably 68 to 74 mol %. The degree of acetalization of the polyvinyl acetal resin can be adjusted within the above range by appropriately adjusting the amount of aldehyde used in acetalizing the polyvinyl alcohol resin. Where the degree of acetalization is within the above range, the compatibility between the polyvinyl acetal resin and the plasticizer is unlikely to decrease. Where the low dielectric layer includes two or more different polyvinyl acetal resins, the degree of acetalization of at least one polyvinyl acetal resin preferably falls within the above range.

The amount of hydroxyl groups in the polyvinyl acetal resin is preferably 6 to 26% by mass, more preferably 12 to 24% by mass, more preferably 15 to 22% by mass, and particularly preferably 18 to 21% by mass, on the basis of the ethylene unit of the polyvinyl acetal main chain. The amount of hydroxyl groups can be adjusted within the above range by appropriately adjusting the amount of aldehyde used in acetalizing the polyvinyl alcohol resin. Where the low dielectric layer includes two or more different polyvinyl acetal resins, the amount of hydroxyl groups of at least one polyvinyl acetal resin preferably falls within the above range.

Polyvinyl acetal resin is usually composed of acetal group units, hydroxyl group units, and acetyl group units, and the amount of each of these units can be measured by, for example, "Polyvinyl butyral test method" of JIS K 6728 or a nuclear magnetic resonance method (NMR). Where the polyvinyl acetal resin contains units other than acetal group units, the unit amount of hydroxyl groups and the unit amount of acetyl groups are measured, and these unit amounts are subtracted from the unit amount of acetal groups where units other than the acetal group units are not contained. Thus, the amount of remaining acetal group units can be calculated.

Although the low dielectric layer preferably contains uncrosslinked polyvinyl acetal from the viewpoint of easily obtaining excellent film formability, it may contain crosslinked polyvinyl acetal. For example, as a method of crosslinking, polyvinyl acetal may be crosslinked by thermal self-crosslinking with carboxyl group-containing polyvinyl acetal, or by intermolecular crosslinking with polyaldehyde, glyoxylic acid, or the like.

The viscosity of polyvinyl acetal resin can be appropriately set depending on the kind being used. For example, in the case of being formed as a thin low dielectric layer, the viscosity of a toluene/ethanol=1/1 (mass ratio) solution with a concentration of 10% by mass, measured at 20° C., 30 rpm using a Brookfield type (Type B) viscometer may be 100 to 1000 mPa·s, preferably 120 to 800 mPa·s, more preferably 150 to 600 mPa·s, further preferably 180 to 500 mPa·s, and particularly preferably 200 to 400 mPa·s. By using a polyvinyl acetal resin having a viscosity within the above range, it is easy to control the heating temperature or heating time within a desired range during the process of thermo-pressure bonding of the resin to a glass substrate, and thereby reducing the possibility of occurring a residual unmolten portion of the polyvinyl acetal resin. Further, it is possible to prevent the antenna circuit board from being misaligned even when the antenna system is exposed to high temperatures. The viscosity of the polyvinyl acetal resin can be adjusted by the use or by the combined use of polyvinyl acetal resin produced using polyvinyl alcohol resin having a high or low viscosity average degree of polymerization as a raw material or a part of the raw material. Where the polyvinyl acetal resin used to constitute the low dielectric layer is composed of a mixture of a plurality of resins, the above-described viscosity is the viscosity of such a mixture.

Where necessary, known or commonly used plasticizer may be combined with the polyvinyl acetal resin. Examples of the plasticizer include the following plasticizers. These plasticizers may be used alone or in combination of two or more. For example, the low dielectric layer may be formed as a plasticized polyvinyl acetal resin composition composed of a plasticizer and a polyvinyl acetal resin.

For examples, the following materials may be used as the placitilizer.

Esters of Polyvalent Aliphatic or Aromatic Acids

Examples include: dialkyl adipates (for example, dihexyl adipate, di-2-ethylbutyl adipate, dioctyl adipate, di-2-ethylhexyl adipate, hexylcyclohexyl adipate, mixture of heptyl adipate and nonyl adipate, diisononyl adipate, heptylnonyl adipate); esters of adipic acid and an alicyclic ester alcohol or alcohol including an ether compound (for example, di(butoxyethyl)adipate, di(butoxyethoxyethyl)adipate); dialkyl sebacates (for example, dibutyl sebacate); esters of sebacic acid and alcohol including an alicyclic or ether compound; esters of phthalic acid (for example, butylbenzyl phthalate, bis-2-butoxyethyl phthalate); and esters of alicyclic monovalent carboxylic acid and aliphatic alcohol (for example, 1,2-cyclohexane dicarboxylic acid diisononyl ester).

Esters or Ethers of Polyhydric Aliphatic or Aromatic Alcohol or Oligoether Glycol Having One or More Aliphatic or Aromatic Substituents Examples include esters of glycerin, diglycol, triglycol, tetraglycol or the like and linear or branched aliphatic or alicyclic carboxylic acid. Specific examples include diethylene glycol-bis-(2-ethylhexanoate), triethylene glycol-bis-(2-ethylhexanoate), triethylene glycol-bis-(2-ethylbutanoate), tetraethylene glycol-bis-n-heptanoate, triethylene glycol-bis-n-heptanoate, triethylene glycol-bis-n-hexanoate, tetraethylene glycol dimethyl ether, and dipropylene glycol benzoate.

Phosphate Esters of Aliphatic or Aromatic Ester Alcohols

Examples include tris(2-ethylhexyl)phosphate (TOF), triethyl phosphate, diphenyl-2-ethylhexyl phosphate, and tricresyl phosphate.

Esters of Citric Acid, Succinic Acid and/or Fumaric Acid

Polyesters or oligoesters including polyhydric alcohol and polyvalent carboxylic acid, terminal esterified products or etherified products thereof, polyesters or oligoesters including lactone or hydroxycarboxylic acid, or terminal esterified products or etherified products thereof, and so on may be used as a plasticizer.

The content of the plasticizer may be, for example, 0 to 40% by mass, preferably 0 to 30% by mass, more preferably 0 to 15% by mass, further preferably 0 to 10% by mass, and further preferably 0 to 5% by mass, relative to the total amount of the polyvinyl acetal resin and the plasticizer.

Preferred polyvinyl acetal resins are commercially available, for example, as "Mowital (trademark)" from Kuraray Co., Ltd., and polyvinyl acetal resin films are commercially available, for example, as "Trosifol (trademark)" from Kuraray Co., Ltd.

Alternatively, where a low dielectric layer made of polyvinyl acetal resin is adhered to an adherend, a plasticizer may further be applied to the film made of polyvinyl acetal resin to enhance the adhesiveness of the polyvinyl acetal resin by the plasticizer. As such plasticizers, the above-mentioned plasticizers can be used, and since adhesiveness of the low dielectric layer can be enhanced, triethylene glycol bis-(2-ethylbutanoate), triethylene glycol-bis-(2-ethylhexanoate), dihexyl adipate, dibutyl sebacate, di(butoxyethyl)adipate, and di(butoxyethoxyethyl)adipate are preferred, triethylene glycol-bis-(2-ethylhexanoate), di(butoxyethyl)adipate, and di(butoxyethoxyethyl)adipate are more preferred, and di(butoxyethyl)adipate and di(butoxyethoxyethyl)adipate are particularly preferred.

(Olefin-Vinyl Carboxylate Copolymer Resin)

Olefin-vinyl carboxylate copolymer resin is not particularly limited as long as it has a dielectric constant lower than that of the first glass layer, and examples of the olefin include ethylene, propylene, n-butene, isobutylene, butadiene, and isoprene, and examples of the vinyl carboxylate include the vinyl ester compounds exemplified in the section of polyvinyl acetal resin. Among these, ethylene-vinyl acetate copolymer resin in which ethylene is used as the olefin and vinyl acetate is used as the vinyl carboxylate compound is preferred because the relative dielectric constant can be controlled and adhesiveness is excellent.

Olefin-vinyl carboxylate copolymer resin may further be copolymerized with a monomer as a third component, as long as the relative dielectric constant can be controlled within a predetermined range. Examples of monomer as the third component include acrylic esters, methacrylic esters, acrylamide and derivatives thereof, methacrylamide and derivatives thereof, vinyl ethers, nitriles, vinyl halides, vinylidene halides, allyl compounds, unsaturated carboxylic acids and derivatives thereof, and vinylsilyl compounds as described in the section of polyvinyl acetal resin. These monomers may be used alone or in combination of two or more. Where such other monomer is copolymerized, it is normally preferred that such other monomer is used in a ratio of less than 10 mol % relative to the vinyl carboxylate compound.

In olefin-vinyl carboxylate copolymer resin, from the viewpoint of strength, the ratio of vinyl carboxylate units to the total of olefin units and vinyl carboxylate units is preferably less than 50 mol %, more preferably 30 mol % or less, further preferably 20 mol % or less, and particularly preferably 15 mol % or less. The lower limit value of vinyl carboxylate is not particularly limited, but may be, for example, about 5 mol %.

Preferred olefin-vinyl carboxylate copolymer resin is, for example, ethylene vinyl acetate, which is commercially available from Tosoh Corporation as "Mersene (trademark)" and the like.

(Ionomer Resin)

Ionomer resin is not particularly limited. For example, thermoplastic resins having a structural unit derived from olefin such as ethylene and a structural unit derived from α,β-unsaturated carboxylic acid, at least part of the α,β-unsaturated carboxylic acid being neutralized by metal ions can be used. Examples of metal ions include: alkali metal ions such as sodium ions; alkaline earth metal ions such as magnesium ions; and zinc ions.

In the ethylene-α,β-unsaturated carboxylic acid copolymer before being neutralized by metal ions, the content of α,β-unsaturated carboxylic acid structural unit is preferably 2% by mass or more, and more preferably 5% by mass or more, based on the mass of the ethylene-α,β-unsaturated carboxylic acid copolymer. Further, the content of α,β-unsaturated carboxylic acid structural unit is preferably 30% by mass or less, and more preferably 20% by mass or less.

Examples of the structural unit derived from α,β-unsaturated carboxylic acid possessed by ionomer resin include structural units derived from acrylic acid, methacrylic acid, maleic acid, monomethyl maleate, monoethyl maleate, or maleic anhydride, and among these, structural units derived from acrylic acid or methacrylic acid are particularly preferred.

As the above-mentioned ionomer resin, from the viewpoint of ease of availability, ionomer of ethylene-acrylic acid copolymer and ionomer of ethylene-methacrylic acid copolymer are more preferred, and a zinc ionomer of ethylene-acrylic acid copolymer, a sodium ionomer of ethylene-acrylic acid copolymer, a zinc ionomer of ethylene-methacrylic acid copolymer, and a sodium ionomer of ethylene-methacrylic acid copolymer are particularly preferred. Ionomer resin may be used alone or in combination of two or more.

A preferred film of ionomer resin is commercially available from Kuraray Co., Ltd. as "SentryGlas (trademark)", for example.

(Acrylic Resin)

Acrylic resin is preferably a polymer obtained from an acrylic ester monomer and/or a methacrylic ester monomer, and examples of the monomer include: alkyl acrylates such as methyl acrylate, ethyl acrylate, and n-propyl acrylate; modified acrylates such as glycidyl acrylate, and 2-hydroxyethyl acrylate; multifunctional acrylates such as ethylene glycol diacrylate, polyethylene glycol diacrylate, polypropylene glycol diacrylate, neopentyl glycol diacrylate, and pentaerythritol triacrylate; alkyl methacrylates such as methyl methacrylate, ethyl methacrylate, and n-propyl methacrylate; modified methacrylates such as glycidyl methacrylate, and 2-hydroxyethyl methacrylate; and multifunctional methacrylates such as ethylene glycol dimethacrylate, polyethylene glycol dimethacrylate, polypropylene glycol dimethacrylate, neopentyl glycol dimethacrylate and pentaerythritol trimethacrylate. These monomers may be used alone or in combination of two or more.

Copolymers of acrylic acid ester monomers and/or methacrylic acid ester monomers, and unsaturated carboxylic acid such as acrylic acid or methacrylic acid; acrylamide such as N,N-dimethylacrylamide; or an aromatic vinyl compound such as styrene or a-methylstyrene may also be suitably used as acrylic resin.

A preferred acrylic resin is commercially available as liquid injection resins such as "3S Resin" from Shinko Glass Industries Co., Ltd.

The low dielectric layer may contain known or commonly used additives, as necessary. Examples of additives include solvents, plasticizers, ultraviolet absorbers, antioxidants, adhesion modifiers, brighteners or fluorescent brighteners, stabilizers, pigments, processing aids, organic or inorganic nanoparticles, calcined silicic acid, and surfactants. The additives may be used alone or in combination of two or more.

[Material of High-Frequency Insulating Layer]

From the viewpoint of excellent heat resistance, an insulating layer made of polyimide (hereinafter sometimes referred to as a polyimide insulating layer) is preferred. Polyimide is not particularly limited as long as it is a polymer having an imide group in its structural unit, and examples include polyimide resins such as polyimide, polyamideimide, polybenzimidazole, polyimide ester, polyetherimide, and polysiloxane imide.

Polyimide can be formed by imidizing (curing) polyamic acid which is a precursor. Polyamic acid can be synthesized by reacting a known diamine and a tetracarboxylic acid (including its acid anhydride) in the presence of a solvent. As diamine, aromatic diamines, aliphatic diamines, alicyclic diamines, and so on can be used, and from the viewpoint of heat resistance, aromatic diamines are preferred. Examples of aromatic diamines include 4,4'-diaminodiphenyl ether, 2'-methoxy-4,4'-diaminobenzanilide, 1,4-bis(4-aminophenoxy)benzene, 1,3-bis(4-aminophenoxy)benzene, 2,2'-bis[4-(4-aminophenoxy)phenyl]propane, 2,2'-dimethyl-4,4'-diaminobiphenyl, 3,3'-dihydroxy-4,4'-diaminobiphenyl, 4,4'-diaminobenzanilide, and 5-amino-2-(p-aminophenyl)benzoxazole. As tetracarboxylic acid, aromatic tetracarboxylic acids, aliphatic tetracarboxylic acids, alicyclic tetracarboxylic acids, acid anhydrides of these and so on can be used, and from the viewpoint of heat resistance, aromatic tetracarboxylic anhydrides are preferred. Examples of aromatic tetracarboxylic anhydrides include pyromellitic anhydride, 3,3',4,4'-biphenyltetracarboxylic dianhydride, 3,3',4,4'-diphenylsulfone tetracarboxylic dianhydride, and 4,4'-oxydiphthalic anhydride. These diamines and tetracarboxylic acids may be used alone or in combination of two or more.

The polyimide film used for the polyimide insulating layer can be prepared by, for example, applying a solution of polyamic acid (polyimide precursor) obtained by reacting diamine and tetracarboxylic acid to a support and drying the solution to obtain a polyamic acid film, followed by a heat treatment for curing (imidization). For application of the polyamic acid solution, known coating methods such as spin coating, comma coater, screen printing, slit coating, roll coating, knife coating, dip coating, and die coating may be used.

Various additives, fillers, and so on may be added to the polyimide film within the range that does not impair the effects of the present invention.

Examples of polyimide films include Kapton EN, Kapton H, and Kapton V (all product names) available from DuPont-Toray Co., Ltd., Apical NPI (product name) available from Kaneka Corporation, and Upilex S (product name) available from UBE Corporation.

From the viewpoint of dielectric property, an insulating layer made of a thermoplastic liquid crystal polymer (hereinafter sometimes referred to as a thermoplastic liquid crystal polymer insulating layer) is preferred for its excellent dielectric property. A thermoplastic liquid crystal polymer film used in the thermoplastic liquid crystal polymer insulating layer is formed from a liquid crystalline polymer which can be molded by melt-molding. The thermoplastic liquid crystal polymer is a polymer capable of forming an optically anisotropic melt phase, and is not particularly limited in its chemical composition as long as it is a melt-moldable liquid crystalline polymer. Examples include thermoplastic liquid crystal polyester, or thermoplastic liquid crystal polyester amide into which an amide bond is introduced to the thermoplastic liquid crystal polyester.

The thermoplastic liquid crystal polymer may be a polymer in which an imide bond, a carbonate bond, a carbodiimide bond, or a bond derived from an isocyanate such as an isocyanurate bond is further introduced into an aromatic polyester or an aromatic polyester amide.

Specific examples of the thermoplastic liquid crystal polymer used in the present invention include known thermoplastic liquid crystal polyesters and thermoplastic liquid crystal polyester amides derived from compounds classified as (1) to (4) illustrated below and derivatives thereof. However, it goes without saying that in order to form a polymer capable of forming an optically anisotropic melt phase, there is an appropriate range of combinations of various raw material compounds.

(1) Aromatic or Aliphatic Dihydroxy Compounds (See Table 1 for Representative Examples)

TABLE 1

| Chemical structural formulae of representative examples of aromatic or aliphatic dihydroxyl compounds |
|---|
| 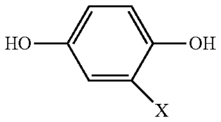 |
| X represents a hydrogen atom or a halogen atom, or a group such as a lower alkyl (e.g., $C_{1-3}$ alkyl) or a phenyl |
| 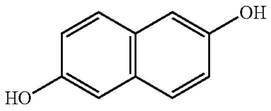 |

TABLE 1-continued

| Chemical structural formulae of representative examples of aromatic or aliphatic dihydroxyl compounds |
|---|
| 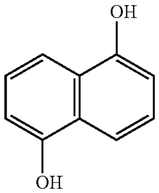 [SMILES: Oc1cccc2c(O)cccc12] |
| 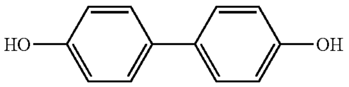 |
| 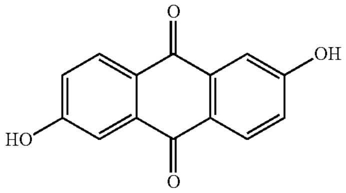 [SMILES: O=C1c2ccc(O)cc2C(=O)c2ccc(O)cc21] |
| 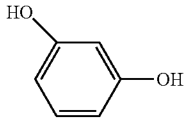 |
| 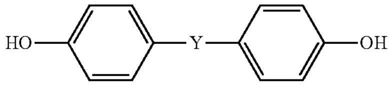 |
| Y represents a group such as —O—, $—CH_2—$, —S—, —CO—, $—C(CH_3)_2—$, or $—SO_2—$ |
| $HO(CH_2)_nOH$ |
| n is an integer of 2 to 12 |

(2) Aromatic or Aliphatic Dicarboxylic Acids (See Table 2 for Representative Examples)

TABLE 2

| Chemical structural formulae of representative examples of aromatic or aliphatic dicarboxylic acids |
|---|
|  |
| 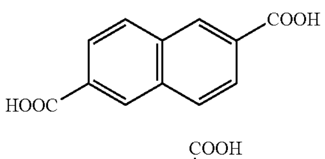 |
| 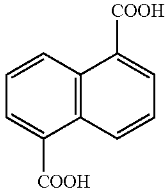 [SMILES: O=C(O)c1cccc2c(C(=O)O)cccc12] |
| 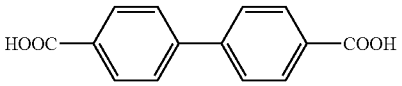 [SMILES: O=C(O)c1ccc(-c2ccc(C(=O)O)cc2)cc1] |

TABLE 2-continued

| Chemical structural formulae of representative examples of aromatic or aliphatic dicarboxylic acids |
|---|
| 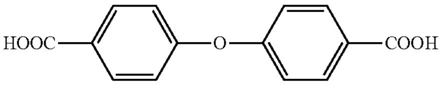 [SMILES: O=C(O)c1ccc(Oc2ccc(C(=O)O)cc2)cc1] |
| 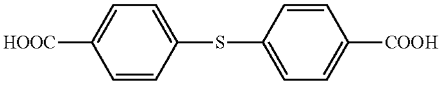 [SMILES: O=C(O)c1ccc(Sc2ccc(C(=O)O)cc2)cc1] |
| 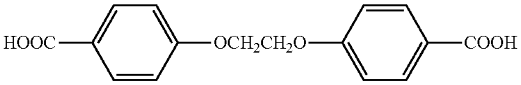 |
| 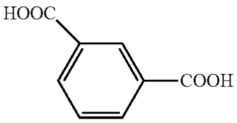 [SMILES: O=C(O)c1cccc(C(=O)O)c1] |
| $HOOC(CH_2)_nCOOH$<br>n is an integer of 2 to 12 |

(3) Aromatic Hydroxycarboxylic Acids (See Table 3 for Representative Examples)

TABLE 3

| Chemical structural formulae of representative examples of aromatic hydroxycarboxylic acids |
|---|
| 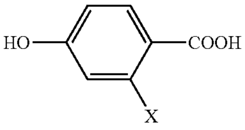 |
| X represents a hydrogen atom or a halogen atom, or a group such as a lower alkyl (e.g., $C_{1-3}$ alkyl) or a phenyl |

TABLE 3-continued

| Chemical structural formulae of representative examples of aromatic hydroxycarboxylic acids |
|---|
| 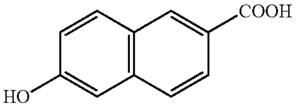 [SMILES: O=C(O)c1ccc2cc(O)ccc2c1] |
| 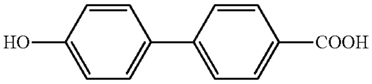 |
| 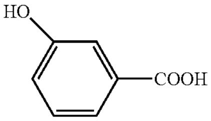 |

(4) Aromatic Diamines, Aromatic Hydroxyamines or Aromatic Aminocarboxylic Acids (See Table 4 for Representative Examples)

TABLE 4

| Chemical structural formulae of representative examples of aromatic diamines, aromatic hydroxy amines, or aromatic aminocarboxylic acids |
|---|
|  |
| 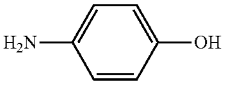 |
| 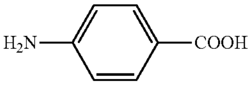 |

Representative examples of thermoplastic liquid crystal polymers obtained from these raw material compounds include copolymers having the structural units shown in Tables 5 and 6.

TABLE 5

| Representative examples (1) of thermoplastic liquid crystal polymer | | | |
|---|---|---|---|
| (A) | 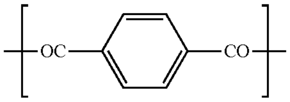 | $-[OCH_2CH_2O]-$ | 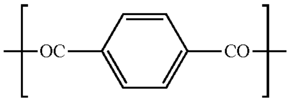 |
| (B) | 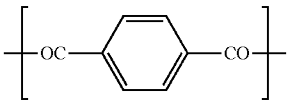 | 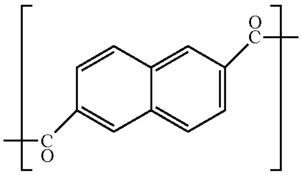 | 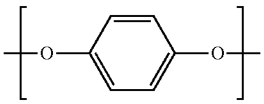 |
| (C) | 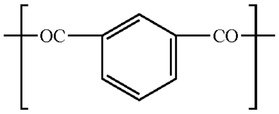 | 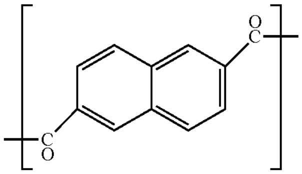 | |

TABLE 5-continued
| Representative examples (1) of thermoplastic liquid crystal polymer | |
|---|---|
| | 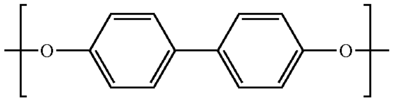 |
| (D) | 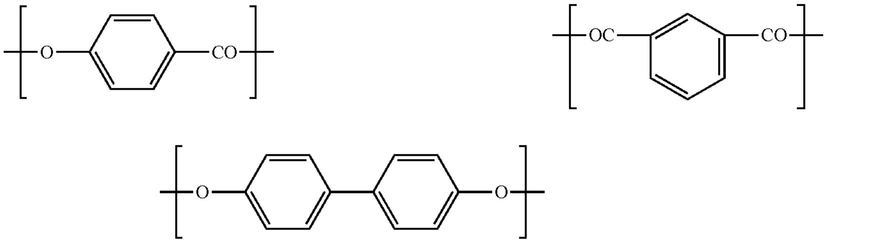 |
| (E) | 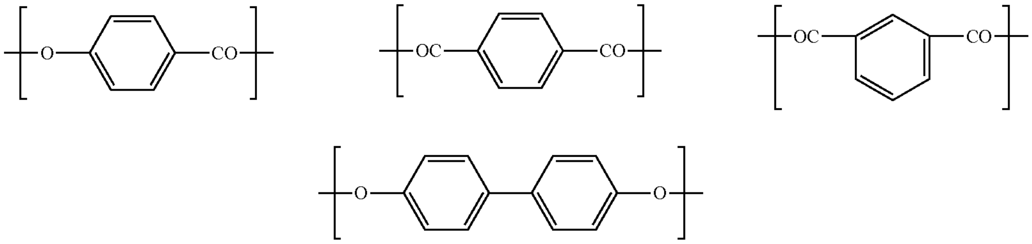 |
| (F) | 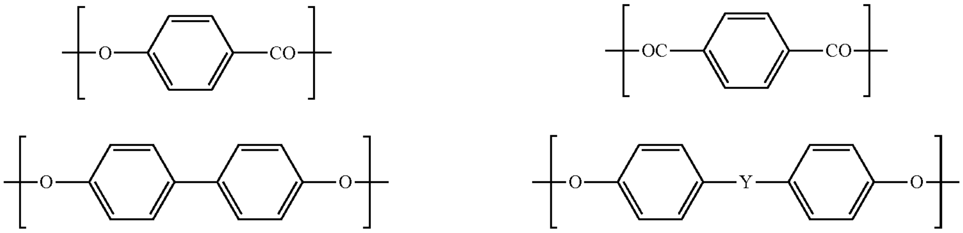 |
| (G) |  |
| (H) | 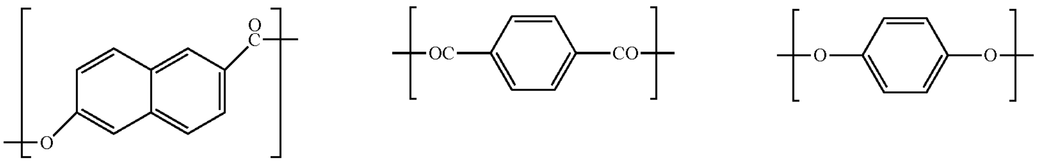 |
| (I) | 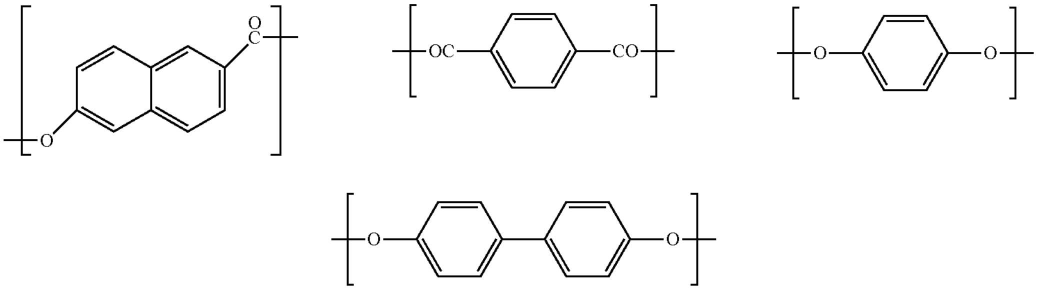 |

TABLE 5-continued
| Representative examples (1) of thermoplastic liquid crystal polymer | |
|---|---|
| (J) | 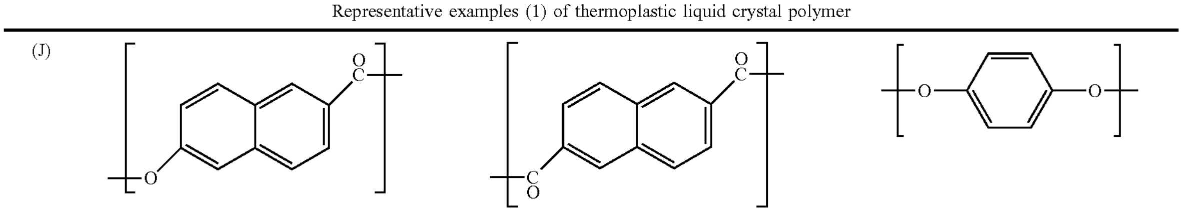 |
TABLE 6
| Representative examples (2) of thermoplastic liquid crystal polymer | |
|---|---|
| (K) | 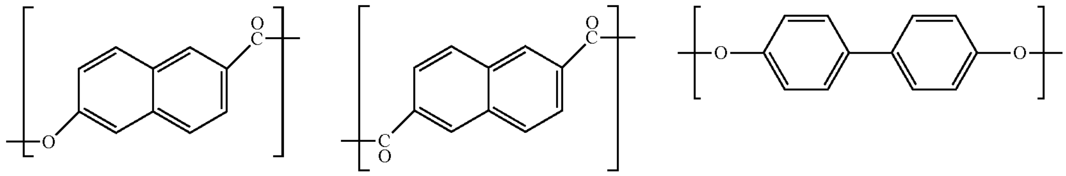 |
| (L) | 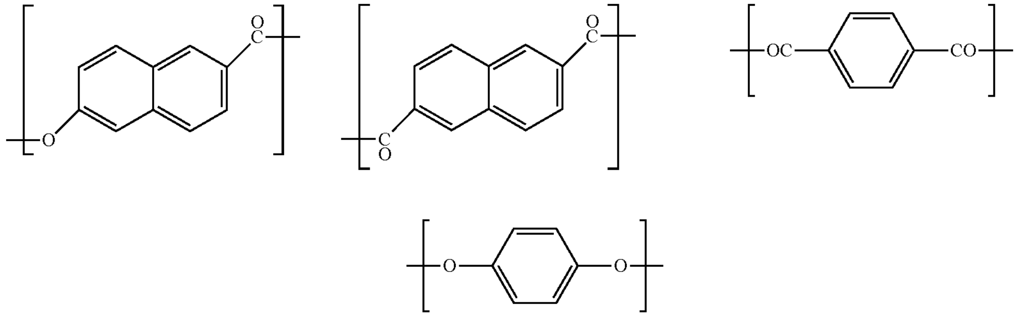 |
| (M) | 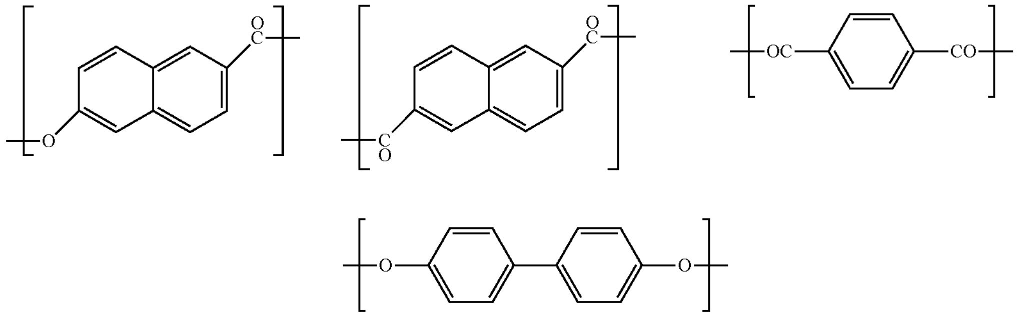 |
| (N) | 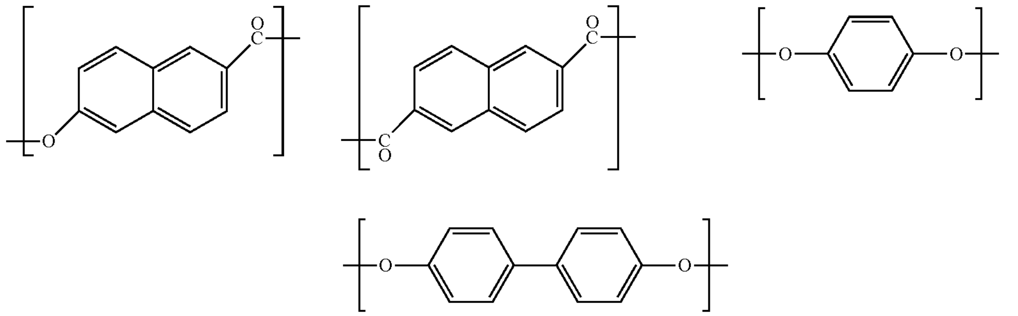 |

TABLE 6-continued

| Representative examples (2) of thermoplastic liquid crystal polymer | |
| --- | --- |
| (O) | 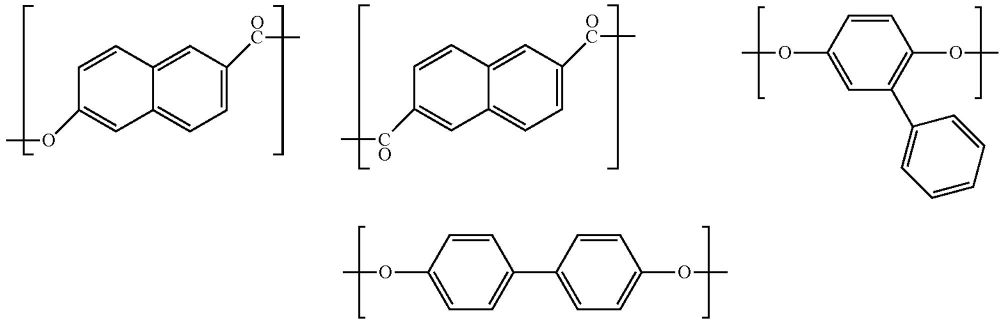 |
| (P) | 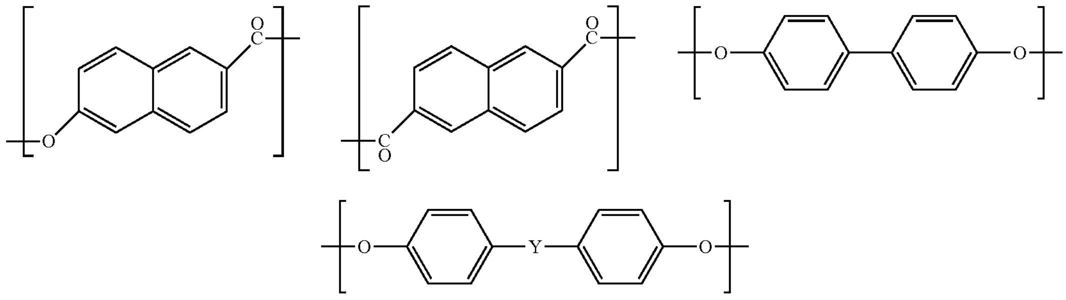<br>Y is a group such as —O—, —S—, or —$CH_2$— |
| (Q) | 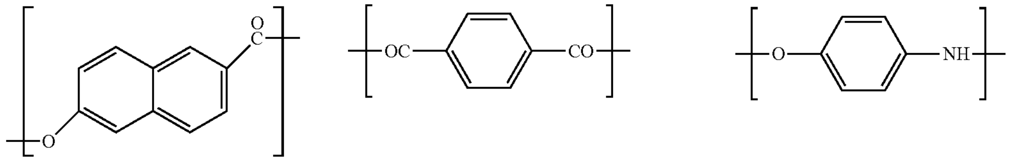 |

Among these copolymers, a polymer containing at least p-hydroxybenzoic acid and/or 6-hydroxy-2-naphthoic acid as repeating units is preferred, and particularly preferred is (i) a polymer containing repeating units of p-hydroxybenzoic acid and 6-hydroxy-2-naphthoic acid, or (ii) a copolymer containing repeating units of at least one aromatic hydroxycarboxylic acid selected from the group consisting of p-hydroxybenzoic acid and 6-hydroxy-2-naphthoic acid, at least one aromatic diol and/or aromatic hydroxyamine, and at least one aromatic dicarboxylic acid.

For example, in the polymer of (i), where the thermoplastic liquid crystal polymer contains repeating units of at least p-hydroxybenzoic acid and 6-hydroxy-2-naphthoic acid, a molar ratio (A)/(B) of p-hydroxybenzoic acid that is a repeating unit (A) and 6-hydroxy-2-naphthoic acid that is a repeating unit (B) may be desirably about (A)/(B)=10/90 to 90/10, more preferably about (A)/(B)=15/85 to 85/15, and further preferably about (A)/(B)=20/80 to 80/20 in the thermoplastic liquid crystal polymer.

In the case of the polymer of (ii), a molar ratio of repeating units of at least one aromatic hydroxycarboxylic acid (C) selected from the group consisting of p-hydroxybenzoic acid and 6-hydroxy-2-naphthoic acid, at least one aromatic diol (D) selected from the group consisting of 4,4'-dihydroxybiphenyl, hydroquinone, phenylhydroquinone, and 4,4'-dihydroxydiphenyl ether, and at least one aromatic dicarboxylic acid (E) selected from the group consisting of terephthalic acid, isophthalic acid and 2,6-naphthalene dicarboxylic acid in thermoplastic liquid crystal polymer may be aromatic hydrxycarboxylic acid (C): the aromatic diol (D): the aromatic dicarboxylic acid (E)=about (30 to 80):(35 to 10):(35 to 10), more preferably about (C):(D):(E)=(35 to 75):(32.5 to 12.5):(32.5 to 12.5), and further preferably about (C):(D):(E)=(40 to 70):(30 to 15):(30 to 15).

In the aromatic hydroxycarboxylic acid (C), the molar percentage of repeating units derived from 6-hydroxy-2-naphthoic acid may be, for example, 85 mol % or more, preferably 90 mol % or more, and more preferably 95 mol % or more. In aromatic dicarboxylic acid (E), the molar percentage of repeating units derived from 2,6-naphthalene dicarboxylic acid may be, for example, 85 mol % or more, preferably 90 mol % or more, and more preferably 95 mol % or more.

The aromatic diol (D) may be repeating units (D1) and (D2) derived from two different aromatic diols selected from the group consisting of hydroquinone, 4,4'-dihydroxybiphenyl, phenylhydroquinone, and 4,4'-dihydroxydiphenyl ether, and in this case, the molar ratio of the two aromatic diols may be (D1)/(D2)=23/77 to 77/23, more preferably 25/75 to 75/25, and further preferably 30/70 to 70/30.

The molar ratio between the repeating structural unit derived from aromatic diol, and the repeating structural unit derived from aromatic dicarboxylic acid is preferably (D)/(E)=95/100 to 100/95. Outside this range, the degree of polymerization does not increase and the mechanical strength tends to decrease.

The expression "capable of forming an optically anisotropic melt phase" as referred to in the present invention can be certified, for example, by placing a sample on a hot stage, heating the sample in a nitrogen atmosphere by temperature elevation, and observing the light transmitted through the sample.

Preferred thermoplastic liquid crystal polymers may have a melting point (hereinafter referred to as $Tm_0$) in the range of 200 to 360° C., preferably in the range of 240 to 360° C., more preferably in the range of 260 to 360° C., and further preferably $Tm_0$ in the range of 270 to 350° C. $Tm_0$ is determined by measuring the temperature at which the main endothermic peak appears using a differential scanning calorimeter (DSC, Shimadzu Corporation). That is, the temperature of the thermoplastic liquid crystal polymer sample is elevated at a rate of 10° C./min until the sample is completely melted, then the melt is cooled to 50° C. at a rate of 10° C./min, and then the temperature is elevated again at a rate of 10° C./min. The position of the endothermic peak that appears after the temperature elevation at a rate of 10° C./min is determined as the melting point of the thermoplastic liquid crystal polymer sample.

To the thermoplastic liquid crystal polymer, any thermoplastic polymer such as polyethylene terephthalate, modified polyethylene terephthalate, polyolefin, polycarbonate, polyarylate, polyamide, polyphenylene sulfide, polyether ether ketone, and fluorine resin, and/or various additives, fillers, and the like may be added as long as the effects of the present invention are not impaired.

The thermoplastic liquid crystal polymer film is obtained, for example, by extrusion molding a melt-kneaded product of the thermoplastic liquid crystal polymer. Any extrusion method can be used, but the well-known T-die method, inflation method, and the like are industrially advantageous. In particular, in the inflation method, stress can be applied not only in a machine axis direction (hereinafter, abbreviated as MD direction) of a thermoplastic liquid crystal polymer film but also in a direction perpendicular thereto (hereinafter, abbreviated as TD direction) to draw a film uniformly in the MD and TD directions, so that an obtained thermoplastic liquid crystal polymer film may have controlled molecular orientation, dielectric characteristics, and the like in the MD and TD directions.

Furthermore, a known or commonly used heat treatment may be performed to adjust the melting point and/or coefficient of thermal expansion of the thermoplastic liquid crystal polymer film as necessary. The heat treatment conditions can be set as appropriate depending on the purpose, and for example, the melting point (Tm) of the thermoplastic liquid crystal polymer may be elevated by heating for several hours at the melting point of the thermoplastic liquid crystal polymer ($Tm_0$) −10° C. or higher (for example, about $Tm_0$−10° C. to $Tm_0$+30° C., preferably about $Tm_0$° C. to $Tm_0$+20° C.).

By providing the obtained thermoplastic liquid crystal polymer film with a circuit layer and/or a conductor layer by a known or commonly used method, it is possible to produce an antenna circuit board having a thermoplastic liquid crystal polymer insulating layer.

The melting point (Tm) of the thermoplastic liquid crystal polymer insulating layer may be, for example, in the range of 200 to 380° C., and preferably in the range of 240 to 370° C. The melting point (Tm) of the thermoplastic liquid crystal polymer insulating layer can be obtained by observing the thermal behavior of a sample obtained from the thermoplastic liquid crystal polymer insulating layer (or thermoplastic liquid crystal polymer film) using a differential scanning calorimeter. That is, the position of the endothermic peak that appears when the temperature of the thermoplastic liquid crystal polymer film sample is elevated at a rate of 10° C./min can be determined as the melting point (Tm) of the thermoplastic liquid crystal polymer film.

The thermoplastic liquid crystal polymer insulation layer may have a thermal expansion coefficient of, for example, from 0 to 25 ppm/° C., and preferably from about 5 to 22 ppm/° C. The thermal expansion coefficient may be determined using a thermomechanical analyzer (TMA), by subjecting a sample to temperature elevation from 25° C. to 200° C. at a rate of 5° C./min, then to cooling at a rate of 20° C./min to 30° C., and again to temperature elevation at a rate of 5° C./min to determine the thermal expansion coefficient from a measurement between 30° C. and 150° C.

EXAMPLES

Hereinafter, the present invention will be specifically described with reference to Examples. However, these Examples are not to be construed as limiting the scope of the present invention.

[Relative Dielectric Constant and Dielectric Loss Tangent]

Relative dielectric constant and dielectric loss tangent in the thickness direction of films used as the low dielectric layer and the high-frequency insulating layer can be measured by the microstrip line method. The relative dielectric constant and the dielectric loss tangent in the planar direction can be measured in accordance with JIS R 1660-2 at a frequency of 28 GHz (25° C.) using Model No. DPS03 (Fabry-Perot resonator) available from KEYCOM Corporation. Measurement is performed in both of one direction and the direction perpendicular to the one direction (X-Y direction) on the plane.

[Thicknesses of Antenna Circuit Board and Low Dielectric Layer]

A thickness of each antenna circuit board may be measured using a micrometer (model No. 227-201-CLM-15QM, manufactured by Mitutoyo Cooperation). A thickness of the low-dielectric layer is determined by measuring a thickness of each film used as a low-dielectric layer. Alternatively, the thickness of the low-dielectric layer may be determined by measuring the thickness of the whole antenna system, and the antenna circuit board and the glass in the antenna system, and subsequently subtracting the thicknesses of the antenna circuit board and the glass from the thickness of the whole antenna system.

[Viscosity of Solution of Polyvinyl Acetal Resin]

A solution is prepared by dissolving polyvinyl acetal resin constituting a polyvinyl acetal resin film in a mixed solvent of toluene/ethanol=1/1 (mass ratio) to give a concentration of 10% by mass. The viscosity of the solution is measured using a Brookfield type (B type) viscometer at 20° C. and a rotation speed of 30 rpm.

[Calculation of Optimum Layer Thickness-1]

A thickness $L_2$ of the transmittance adjustment layer for providing maximum transmittance at a frequency of 28 GHZ was calculated for tow cases of different glass thickness (2 mm and 3 mm) using a multilayer plate reflection transmission coefficient (1D) simulator RT1D Ver.1.2.0, where a relative dielectric constant of the glass layer was set 6.5 and a relative dielectric constant of the transmittance adjustment layer was set 2.7. The thickness $L_2$ was calculate for each case of different incident angles of high-frequency wave to the laminate of the glass and the transmittance adjustment layer, where incident angle was set at 0°, 30°, 45°, 60°, and 75°. The results are shown in Table 7.

TABLE 7

| | | Frequency | | | |
|---|---|---|---|---|---|
| | | 28 GHz | | 28 GHz | |
| | | Thickness of glass layer | | | |
| | | 2 mm | | 3 mm | |
| | Period | N = 1 | N = 2 | N = 1 | N = 2 |
| $L_2$ (mm) | $\theta_0 = 0°$ | 0.2 | 3.6 | 1.7 | 5.0 |
| | 30° | 0.3 | 3.8 | 1.8 | 5.3 |
| | 45° | 0.6 | 4.2 | 2.1 | 5.7 |
| | 60° | 0.6 | 4.5 | 2.2 | 6.1 |
| | 75° | 0.8 | 4.8 | 2.4 | 6.4 |

Here, $\lambda/10\sqrt{\varepsilon_2}$ is 0.65 mm from the wavelength of the high-frequency wave of 10.7 mm. Therefore, for example, based on the optimum value of 45°, the thickness $L_2$ of the transmittance adjustment layer may be adjusted to a range of 0.6±0.65 mm or 4.2±0.65 mm where the glass layer is 2 mm, or to a range of 2.1±0.65 mm or 5.7±0.65 mm where the glass layer is 3 mm.

[Calculation of Optimum Layer Thickness-2]

A thickness $L_2$ of the transmittance adjustment layer providing minimum intensity of reflected wave was calculated using the above-described formula (1) for a case where the frequency was 5.8 GHz and the glass thickness was 3 mm, and for a case where the frequency was 28 GHz and the glass thickness was 3 mm. The thickness $L_2$ was calculate for each case of different incident angles of high-frequency wave to the laminate of the glass and the transmittance adjustment layer, where incident angle was set at 0°, 30°, 45°, 60°, and 75°. Specifically, graphs showing the thickness dependence of the reflection intensity as in FIG. 6A was prepared under the above-described conditions where the high-frequency permeable layer is of two layers, and the optimum values were read from the graphs. The calculation results are shown in Table 8.

TABLE 8

| | | Frequency | | | |
|---|---|---|---|---|---|
| | | 5.8 GHz | | 28 GHz | |
| | | Thickness of glass layer | | | |
| | | 3 mm | | 3 mm | |
| | Period | N = 1 | N = 2 | N = 1 | N = 2 |
| $L_2$ (mm) | $\theta_0 = 0°$ | 10 | 26 | 1.8 | 5.0 |
| | 30° | 11 | 27.5 | 2.0 | 5.4 |
| | 45° | 12 | 29 | 2.2 | 5.8 |
| | 60° | 13 | 31.5 | 2.4 | 6.2 |
| | 75° | 14 | 33 | 2.7 | 6.7 |

In the case where the high-frequency wave has a frequency of 28 GHz and the glass layer has a thickness of 3 mm, the optimum value of the thickness $L_2$ of the transmittance adjustment layer determined from the minimum value of the reflection intensity gives a value approximate to the value determined from simulation of transmittance shown in Table 7.

Here, where the frequency is 5.8 GHz, the wavelength of the high-frequency wave is 51.7 mm, so that $\lambda/10\sqrt{\varepsilon_2}$ is 3.15 mm. Where the frequency is 28 GHz, $\lambda/10\sqrt{\varepsilon_2}$ is 0.65 mm as described above. Therefore, for the optimum layer thickness at an incident angle of 45° determined from the table, the thickness of the transmittance adjustment layer may be controlled within the range of ±3.15 mm where the frequency of the high-frequency wave is 5.8 GHz, and within the range of ±0.65 mm where the frequency of the high-frequency wave is 28 GHz.

The optimum value of the layer thickness of the high-frequency permeable layer (in this case, the transmittance adjustment layer) determined as described above can be applied, for example, in production of the antenna system described below.

(Preparation of Antenna Circuit Board)

Copper foils (electrolytic copper foil "H9A", available from Fukuda Metal Foil & Powder Co., Ltd., thickness: 12 μm) are overlaid on both surfaces of a thermoplastic liquid crystal polymer film (Vecstar (registered trademark), available from Kuraray Co., Ltd., thickness: 50 μm, relative dielectric constant in the X direction: 3.4, relative dielectric constant in the Y direction: 3.4, dielectric loss tangent in the X direction: 0.002, dielectric loss tangent in the Y direction: 0.002), and the foils are pressure-bonded to the film under a pressure of 4 MPa for 15 minutes using a vacuum hot press with a heating plate set at 290° C. Thus a copper-clad laminate having a configuration of copper foil/thermoplastic liquid crystal polymer film/copper foil is prepared. By removing part of the copper foil on one surface of the resulting copper-clad laminate using an etching solution, a circuit is formed, and by repeating this operation, a 400 μm thick antenna circuit board (5 cm long and 5 cm wide) is prepared.

(Preparation of Polyvinyl Acetal Resin Film)

Polyvinyl butyral resin 1 (amount of hydroxyl group: 19.8% by mass, acetalization degree: 70.8 mol %, amount of acetyl group: 1.0% by mass, viscosity of resin: 152 mPa·s) and polyvinyl butyral resin 2 (amount of hydroxyl group: 20.1% by mass, acetalization degree: 70.4 mol %, amount of acetyl group: 0.9% by mass, viscosity of resin: 1410 mPa·s) are blended at a mass ratio of 75:25, melt-kneaded, extruded into strands, and pelletized.

The obtained pellets are melt-extruded using a single-screw extruder and a T-die, and a polyvinyl acetal resin film with a thickness of 12 mm with a smooth surface is obtained using a metal elastic roll (relative dielectric constant in the X direction: 2.5, relative dielectric constant in the Y direction: 2.5, dielectric loss tangent in the X direction: 0.01, dielectric loss tangent in the Y direction: 0.01, plasticizer content: 0% by mass, resin viscosity: 245 mPa·s).

(Preparation of Laminate)

On the lower glass of 20 cm in length, 10 cm in width, and 3 mm in thickness, a Teflon (registered trademark) sheet with embossing on one side, the dried polyvinyl acetal resin film of 5 cm in length, 5 cm in width, and 12 mm in thickness prepared above, the antenna circuit board (5 cm in length, 5 cm in width) prepared above, a Teflon (registered trademark) sheet with embossing on one side, and upper glass of 5 cm in length, 5 cm in length, and 3 mm in thickness, are stacked in this order and fixed. The polyvinyl acetal resin film, the antenna circuit board, and the upper glass are aligned so that they overlap with each other.

The Teflon (registered trademark) sheet adjacent to the polyvinyl acetal resin film is arranged such that the embossed surface is in contact with the polyvinyl acetal resin film. The Teflon (registered trademark) sheet adjacent to the antenna circuit board is arranged such that the mirror surface is in contact with the antenna circuit board. The antenna circuit board is arranged such that the surface having the circuit is in contact with the polyvinyl acetal resin film.

After heating the stacked body at 140° C. for 15 minutes in vacuum with a vacuum laminator, the upper chamber is set to −10 kPa (differential pressure from the lower chamber is approximately 90 kPa) and held at that state for 15 minutes, then returned to normal pressure. Then, the Teflon (registered trademark) sheets provided on the upper side and lower side and the upper and lower glass are removed. In the prepared laminate, polyvinyl acetal resin film (transmittance adjustment layer)/circuit (circuit layer)/antenna circuit board inner layer (multilayer board with thermoplastic liquid crystal polymer film as the insulating layer)/copper foil (conductor layer) are laminated in this order. The layer thickness of the polyvinyl acetal resin film can be adjusted to a desired thickness by laminating and pressure-bonding a plurality of layers, as necessary.

(Preparation of Antenna System)

The above-described laminate (5 cm in length, 5 cm in width) is stacked on the lower glass 20 cm in length, 10 cm in width, and 3 mm in thickness (relative dielectric constant in the X direction: 6.5, relative dielectric constant in the Y direction: 6.5, dielectric loss tangent in the X direction: 0.01, dielectric loss tangent in the Y direction: 0.01) such that the polyvinyl acetal resin film (transmittance adjustment layer) is in contact with the lower glass. Further, a Teflon (registered trademark) sheet and upper glass of 5 cm in length, 5 cm in width, and 3 mm in thickness are stacked on the laminate in this order, and the stacked body is fixed. The antenna circuit board is provided in an area of 2 cm or more and 7 cm or less inward from the longitudinal end of the lower glass. The laminate and the upper glass are aligned so that they overlap with each other.

After heating the stacked body at 140° C. for 15 minutes in vacuum with a vacuum laminator, the upper chamber is set to −10 kPa (differential pressure from the lower chamber is approximately 90 kPa) and held for 15 minutes at that state, then returned to normal pressure. Then, Teflon (registered trademark) sheet and the upper glass are removed. In the thus obtained antenna system, glass (f)/polyvinyl acetal resin film (transmittance adjustment layer)/circuit (circuit layer)/antenna circuit board inner layer (multilayer board with thermoplastic liquid crystal polymer film as the insulating layer)/copper foil (conductor layer) are laminated in this order and the antenna circuit board is disposed in a part of the glass. In the resulting antenna system, high-frequency wave having entered the glass can efficiently pass through the transmittance adjustment layer and reach the antenna circuit board.

In the above example, the antenna system has a laminated structure of glass (first glass layer)/polyvinyl acetal resin film (low dielectric layer)/antenna circuit board, and a low dielectric layer and a second glass layer may be further laminated under the antenna circuit board, as necessary.

In place of the transmittance adjustment layer used in the above example, the following transmittance adjustment layer can also be used.

(A) Polyvinyl acetal resin film (relative dielectric constant in the X direction: 2.5, relative dielectric constant in the Y direction: 2.5, dielectric loss tangent in the X direction: 0.01, dielectric loss tangent in the Y direction: 0.01, plasticizer content: 0% by mass, resin viscosity: 245 mPa·s) formed by blending polyvinyl butyral resin 1 (hydroxyl group content: 19.8% by mass, acetalization degree: 70.8 mol %, acetyl group content: 1.0% by mass, viscosity of resin: 152 mPa·s) and polyvinyl butyral resin 2 (hydroxyl group content: 20.1% by mass, acetalization degree: 70.4 mol %, acetyl group content: 0.9% by mass, viscosity of resin; 1410 mPa·s) at a mass ratio of 75:25, and forming the film in the same manner as described above.

(B) Ionomer resin film (a film obtained by thinning SentryGlas (registered trademark) SG5000 X available from Kuraray Co., Ltd. by heat pressing, relative dielectric constant in the X direction: 2.2, relative dielectric constant in the Y direction: 2.2, dielectric tangent in the X direction: 0.002, dielectric tangent in the Y direction: 0.002)

(C) Polyvinyl acetal film (available from Kuraray Co., Ltd., V200KE, thickness: 700 μm, relative dielectric constant in the X direction: 2.7, relative dielectric constant in the Y direction: 2.7, dielectric loss tangent in the X direction: 0.02, dielectric loss tangent in the Y direction: 0.02)

In place of the insulating layer used in the above example, the following insulating layer may also be used.

Polyimide film (available from DuPont-Toray Co., Ltd., Kapton 300H, thickness: 75 μm, relative dielectric constant in the X direction: 3.3, relative dielectric constant in the Y direction: 3.3, dielectric loss tangent in the X direction: 0.007, dielectric loss tangent in the Y direction: 0.007).

Polyimide film (available from Kaneka Corporation, Apical NPI, thickness: 50 μm, relative dielectric constant in the X direction: 3.4, relative dielectric constant in the Y direction: 3.4, dielectric loss tangent in the X direction: 0.004, dielectric loss tangent in the Y direction: 0.004).

In the above-described example, the glass layer is made of glass with a relative dielectric constant of 6.5. However, organic glass such as acrylic glass or polycarbonate may also be used.

In the above-described example, a laminator is used for laminating the layers, however, a laminated material put in a vacuum bag may be subjected to preheating, followed by heating and pressurizing. For example, as an example of specific conditions, a laminated material is put in a vacuum bag, the pressure is reduced at normal temperature for 15 minutes, and then the temperature is raised to 100° C. under reduced pressure and held for 30 minutes, and then the temperature is lowered and the reduced pressure is released and temporal pressure bonding is carried out, and then the vacuum bag may be put into an autoclave, and treated at 140° C. and 12 MPa for 30 minutes.

Alternatively, the antenna system may be produced by applying triethylene glycol di-(2-ethylhexanoate) or dibutoxyethyl adipate to the low dielectric layer of the laminate for antenna system and adhering to glass, and carrying out hot-air drying.

INDUSTRIAL APPLICABILITY

The antenna system of the present invention inhibits attenuation of high-frequency wave and enhances the transmission characteristics of the antenna circuit board for high-frequency wave, and can exchange a large amount of information. Therefore, the antenna system of the present invention can be advantageously used as: a vehicle antenna system for automated driving and constant communication by in-vehicle devices in so-called connected cars; and a small cell base station antenna system installed on windows and walls of buildings, various civil engineering structures (railway facilities, road facilities, energy facilities, dams/river facilities, water and sewage facilities, airport facilities) and so on. For example, the antenna system of the present invention can constitute window glass of a vehicle or a building, or be attached to a vehicle or a building. The antenna system of the present invention may also be installed in electronic devices such as display devices. Examples of display devices include large screen televisions, monitors, tablets, smartphones, laptop computers, desktop computers, personal digital assistants, or other display devices. The antenna system of the present invention can also be installed, for example, on the back glass of a smartphone.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . antenna system
2 . . . laminate
3 . . . laminated glass
4 . . . laminate for antenna system
10, 11 . . . first glass layer
20 . . . transmittance adjustment layer (low dielectric layer)
21, 21*a* to 21*d* . . . interlayer film
30, 31 . . . antenna circuit board
30*a*, 31*a* . . . circuit layer
30*b*, 31*b* . . . high-frequency insulating layer
30*c*, 31*c* . . . conductor layer
31*d* . . . via
40 . . . base body
50 . . . adhesive layer

What is claimed is:

1. An antenna system to be used at a frequency of 1 GHz or higher, comprising:

a laminate comprising a plurality of high-frequency permeable layers that are mutually in contact at interfaces and respectively transmit high-frequency wave; and an antenna circuit board comprising a high-frequency insulating layer, and disposed adjacent to an outermost high-frequency permeable layer of the laminate, the antenna circuit board receiving the high-frequency wave having been transmitted through the laminate, wherein n-th layer of the plurality of high-frequency permeable layers has a thickness Ln within a range of $L_{nmin}\pm\lambda/(10\sqrt{\varepsilon_n})$, the n-th layer being at least one high-frequency permeable layer of the laminate, where when the high-frequency wave is incident on the laminate, the n-th layer is defined as an n-th high-frequency permeable layer in the laminate, counting in an order of incidence, $\varepsilon_n$ denotes a relative dielectric constant of the n-th layer, $\lambda$ denotes a wavelength of the high-frequency wave that is incident on the laminate, and $L_{nmin}$ denotes a thickness of the n-th layer where an intensity of a reflected wave from the laminate is minimized, the intensity being determined as an intensity of a composite wave of reflected waves from a front surface, a back surface, and joint interfaces of the laminate.

2. The antenna system as recited in claim 1, wherein the intensity of the reflected wave from the laminate is a square $As^2$ of an amplitude As that satisfies the following formula (1):

$$A_s\sin(2\pi(x+\Delta x_{s)})/\lambda = \sum A_n\sin(2\pi(x+\Delta x_n)/\lambda) \tag{1}$$

where $$A_n = (\sqrt{\varepsilon_{n-1}}\cos\theta_{n-1} - \sqrt{\varepsilon_n}\cos\theta_n)/(\sqrt{\varepsilon_{n-1}}\cos\theta_{n-1} + \sqrt{\varepsilon_n}\cos\theta_n))\prod(1-A_{n-1}^2)$$

$$\Delta x_n = \Delta x_{n-1} + 2L_{n-1}(\sqrt{\varepsilon_{n-1}} - \sqrt{\varepsilon_1}\sin\theta_1\sin\theta_{n-1})/\cos\theta_{n-1}$$

$$\sqrt{\varepsilon_{n-1}}\sin\theta_{n-1} = \sqrt{\varepsilon_n}\sin\theta_n$$

where $\varepsilon_n$ denotes a relative dielectric constant of the n-th layer constituting the laminate, $L_n$ denotes a thickness of the n-th layer constituting the laminate, $\theta_n$ denotes a refraction angle of the high-frequency wave that has entered the n-th layer constituting the laminate, $\lambda$ denotes a wavelength in air of the high-frequency wave that is incident on the laminate, $\varepsilon_0$ denotes a relative dielectric constant in air, n denotes an integer of 1 or more, $A_0=0$, $\Delta x_0=0$, $L_0=0$, and $\theta_0$=incident angle of the high-frequency wave entering the laminate.

3. The antenna system as recited in claim 1, wherein the intensity of the reflected wave from the laminate is determined for cases where the incident angle of high-frequency wave on the laminate is 40° to 60°.

4. The antenna system as recited in claim 1, wherein the intensity of the reflected wave from the laminate is determined for a case where the incident angle of high-frequency wave to the laminate is 45°.

5. The antenna system as recited in claim 1, wherein the high-frequency permeable layers constituting the laminate include at least one glass layer, and at least one transmittance adjustment layer formed of a resin layer having a lower relative dielectric constant than the glass, and in a case where the transmittance adjustment layer is the n-th layer, a thickness of the transmittance adjustment layer falls within the range of $L_{nmin}\pm\lambda/(10\sqrt{\varepsilon_n})$.

6. The antenna system as recited in claim 1, that constitutes a display device, or window glass of a vehicle or a building.

7. The antenna system as recited in claim 1, that is configured to receive radio waves while being attached to a vehicle, a building, or a civil engineering structure.

8. A method for designing the antenna system as recited in claim 1, comprising adjusting a thickness of each layer constituting the laminate so that a thickness Ln of the n-th layer falls within a range of $L_{nmin}\pm\lambda/(10\sqrt{\varepsilon_n})$.

9. An antenna circuit board to be used in the antenna system as recited in claim 1.

10. A method for manufacturing an antenna system to be used at a frequency of 1 GHz or higher, the antenna system comprising:

a laminate comprising a plurality of high-frequency permeable layers that are mutually in contact at interfaces and respectively transmit high-frequency wave; and an antenna circuit board comprising a high-frequency insulating layer, and disposed adjacent to an outermost high-frequency permeable layer of the laminate, the antenna circuit board receiving the high-frequency wave having been transmitted through the laminate, the method comprising setting a thickness Ln of n-th layer of the plurality of high-frequency permeable layers within a range of $L_{nmin} \pm \lambda/(10\sqrt{\varepsilon_n})$, the n-th layer being at least one high-frequency permeable layer of the laminate, where the n-th layer is defined as an n-th high-frequency permeable layer in the laminate, counting in an order from a surface of the laminate, $\varepsilon_n$ denotes a relative dielectric constant of the n-th layer, $\lambda$ denotes a wavelength of the high-frequency wave that is incident on the laminate, and $L_{nmin}$ denotes a thickness of the n-th layer where an intensity of a reflected wave from the laminate is minimized, the intensity being determined as an intensity of a composite wave of reflected waves from a front surface, a back surface, and joint interfaces of the laminate.

11. The method for manufacturing an antenna system as recited in claim 10, wherein the laminate includes a laminate precursor comprising at least one glass layer, and at least one transmittance adjustment layer made of a resin layer having a lower relative dielectric constant than the glass layer contained in the laminate precursor, and in case where the transmittance adjustment layer is the n-th layer, the method comprises joining the antenna circuit board with the laminate precursor via the transmittance adjustment layer while controlling a thickness of the transmittance adjustment layer within a range of $L_{nmin} \pm \lambda/(10\sqrt{\varepsilon_n})$.

12. The method for manufacturing an antenna system as recited in claim 10, wherein the intensity of the reflected wave from the laminate is a square $As^2$ of an amplitude As that satisfies the following formula (1):

$$A_s \sin(2\pi(x + \Delta x_{s)}/\lambda = \sum A_n \sin(2\pi(x + \Delta x_n)/\lambda) \quad (1)$$

where $$A_n = (\sqrt{\varepsilon_{n-1}} \cos\theta_{n-1} - \sqrt{\varepsilon_n} \cos\theta_n)/(\sqrt{\varepsilon_{n-1}} \cos\theta_{n-1} + \sqrt{\varepsilon_n} \cos\theta_n)) \prod (1 - A_{n-1}^2)$$

$$\Delta x_n = \Delta x_{n-1} + 2L_{n-1}(\sqrt{\varepsilon_{n-1}} - \sqrt{\varepsilon_1} \sin\theta_1 \sin\theta_{n-1})/\cos\theta_{n-1}$$

$$\sqrt{\varepsilon_{n-1}} \sin\theta_{n-1} = \sqrt{\varepsilon_n} \sin\theta_n$$

where $\varepsilon_n$ denotes a relative dielectric constant of the n-th layer constituting the laminate, $L_n$ denotes a thickness of the n-th layer constituting the laminate, $\theta_n$ denotes a refraction angle of the high-frequency wave having entered the n-th layer constituting the laminate, $\lambda$ denotes a wavelength in air of the high-frequency wave that is incident on the laminate, $\varepsilon_0$ denotes a relative dielectric constant in air, n denotes an integer of 1 or more, $A_0=0$, $\Delta x_0=0$, $L_0=0$, and $\theta_0$=incident angle of the high-frequency wave that is incident on the laminate.

13. The method for manufacturing an antenna system as recited in claim 10, wherein the intensity of the reflected wave from the laminate is determined for a case where the incident angle of the high-frequency wave on the laminate is 40 to 60°.

* * * * *